(12) United States Patent
Dragic

(10) Patent No.: US 11,591,999 B2
(45) Date of Patent: Feb. 28, 2023

(54) SYSTEM FOR CONVERSION OF WAVE ENERGY INTO ELECTRICAL ENERGY

(71) Applicant: Mile Dragic, Zrenjanin (RS)

(72) Inventor: Mile Dragic, Zrenjanin (RS)

( * ) Notice: Subject to any disclaimer, the term of this patent is extended or adjusted under 35 U.S.C. 154(b) by 0 days.

(21) Appl. No.: 17/478,188

(22) Filed: Sep. 17, 2021

(65) Prior Publication Data

US 2022/0003201 A1 Jan. 6, 2022

Related U.S. Application Data

(63) Continuation of application No. 16/298,825, filed on Mar. 11, 2019, now Pat. No. 11,125,204, which is a
(Continued)

(51) Int. Cl.
*F03B 13/18* (2006.01)
*F03B 13/20* (2006.01)
*F03B 13/26* (2006.01)

(52) U.S. Cl.
CPC ............ *F03B 13/18* (2013.01); *F03B 13/186* (2013.01); *F03B 13/187* (2013.01);
(Continued)

(58) Field of Classification Search
CPC ................. F03B 13/18; F03B 13/1815; F03B 13/1855; F03B 13/186; F03B 13/187;
(Continued)

(56) References Cited

U.S. PATENT DOCUMENTS

| 639,734 A | 12/1899 | Johnson |
| 1,364,619 A | 1/1921 | Dolliver |

(Continued)

FOREIGN PATENT DOCUMENTS

| CA | 2436187 | 1/2005 |
| DE | 2934288 | 3/1981 |

(Continued)

*Primary Examiner* — Hoang M Nguyen
(74) *Attorney, Agent, or Firm* — Barnes & Thornburg LLP; Mark J. Nahnsen

(57) ABSTRACT

The present invention relates to the utilization of wave energy and its conversion into operating motion of an electrical energy generating system. The system for generation of electrical energy through the conversion of aquatic wave motion includes floating bodies and a constant rotation mechanism, which converts the two-way linear motion of an inflexible transmission shaft or a flexible transmission shafts into one-way rotation of an output shaft of the constant rotation mechanism. This mechanism allows utilization of wave energy in two directions caused by the rise and fall of waves. The output shaft of the constant rotation mechanism is coupled to a force multiplier that is further coupled to a generator which generates electrical energy. Constant rotation mechanism can be driven by inflexible transmission shaft pivotally coupled to the floating bodies at one end, and the other end to an input gear of the constant rotation mechanism. Depending on the height of the wave and the wavelength, various constructions of floating bodies are used. Certain floating bodies are designed for the waves of a smaller amplitude and smaller wavelength, while other floating bodies are designed for bigger amplitude and bigger wavelength.

16 Claims, 29 Drawing Sheets

Related U.S. Application Data continuation of application No. 14/681,568, filed on Apr. 8, 2015, now Pat. No. 10,227,961, which is a continuation of application No. 12/606,453, filed on Oct. 27, 2009, now Pat. No. 9,016,055, which is a continuation-in-part of application No. PCT/IB2008/003418, filed on Dec. 10, 2008, and a continuation-in-part of application No. PCT/IB2007/002631, filed on Sep. 13, 2007.

(52) U.S. Cl.
CPC ........ *F03B 13/189* (2013.01); *F03B 13/1815* (2013.01); *F03B 13/1855* (2013.01); *F03B 13/1875* (2013.01); *F03B 13/1885* (2013.01); *F03B 13/20* (2013.01); *F03B 13/262* (2013.01); *F05B 2240/40* (2013.01); *Y02E 10/30* (2013.01)

(58) Field of Classification Search
CPC  F03B 13/1875; F03B 13/1885; F03B 13/189; F03B 13/20; F03B 13/262; F05B 2240/40; Y02E 10/30
USPC .... 60/398, 495, 497, 504, 505, 507; 290/42, 290/53
See application file for complete search history.

(56) References Cited

U.S. PATENT DOCUMENTS

| | | | |
|---|---|---|---|
| 1,393,472 A * | 10/1921 | Williams | ............... F03B 13/262 405/76 |
| 1,497,205 A | 6/1924 | Boosinger | |
| 1,711,103 A | 4/1929 | Smith | |
| 1,816,044 A | 7/1931 | Gallagher | |
| 1,823,190 A | 9/1931 | Neil | |
| 2,749,085 A | 6/1956 | Searcy | |
| 2,783,022 A | 2/1957 | Salzer | |
| 3,567,953 A | 3/1971 | Lord | |
| 3,879,950 A | 4/1975 | Yamada | |
| 3,880,105 A | 4/1975 | Bryant | |
| 3,930,168 A | 12/1975 | Tornabene | |
| 3,965,365 A | 6/1976 | Parr | |
| 4,125,346 A | 11/1978 | Pickle | |
| 4,145,885 A | 3/1979 | Solell | |
| 4,184,336 A | 1/1980 | Lamberti | |
| 4,208,878 A | 6/1980 | Rainey | |
| 4,232,230 A | 11/1980 | Ames | |
| 4,241,579 A | 12/1980 | Borgren | |
| 4,364,715 A | 12/1982 | Bolding | |
| 4,389,843 A | 6/1983 | Lamberti | |
| 4,434,375 A * | 2/1984 | Taylor | ................ F03B 13/1885 60/504 |
| 4,539,484 A | 9/1985 | Suggs | |
| 4,672,222 A | 6/1987 | Ames | |
| 5,359,229 A | 10/1994 | Youngblood | |
| 5,710,464 A | 1/1998 | Kao et al. | |
| 5,775,248 A | 7/1998 | Simola | |
| 5,842,838 A | 12/1998 | Berg | |
| 5,929,531 A * | 7/1999 | Lagno | ................... F03B 13/262 417/330 |
| 6,208,035 B1 | 3/2001 | Kao | |
| 6,857,266 B2 | 2/2005 | Dick | |
| 6,935,808 B1 | 8/2005 | Dempster | |
| 7,841,177 B1 * | 11/2010 | Detwiler | ............... F03B 13/186 60/497 |
| 8,899,036 B2 | 12/2014 | Cherepashenets | |
| 9,016,055 B2 * | 4/2015 | Dragic | ................ F03B 13/1875 60/507 |
| 2005/0022714 A1 | 2/2005 | Low | |
| 2006/0080957 A1 | 4/2006 | Gomez et al. | |
| 2006/0202483 A1 | 9/2006 | Gonzalez | |
| 2007/0080539 A1 | 4/2007 | Kelly | |
| 2007/0126239 A1 | 6/2007 | Stewart et al. | |
| 2008/0309088 A1 | 12/2008 | Agamloh et al. | |
| 2009/0146429 A1 | 6/2009 | Protter et al. | |
| 2009/0211240 A1 | 8/2009 | Patton | |
| 2010/0043425 A1 | 2/2010 | Dragic | |
| 2010/0109329 A1 * | 5/2010 | Brantingham | ....... F03B 13/1845 290/53 |
| 2010/0259047 A1 | 10/2010 | Chi | |
| 2013/0127168 A1 | 5/2013 | Dragic | |

FOREIGN PATENT DOCUMENTS

| | | |
|---|---|---|
| DE | 3027593 | 2/1982 |
| DE | 19515138 | 10/1996 |
| FR | 459312 | 11/1913 |
| FR | 490041 | 3/1919 |
| FR | 538736 | 6/1922 |
| FR | 655131 | 4/1929 |
| FR | 872125 | 5/1942 |
| FR | 2392174 | 12/1978 |
| GB | 15279 | 12/1913 |
| GB | 03691 | 2/1914 |
| GB | 1515744 | 6/1978 |
| GB | 2027815 | 2/1980 |
| GB | 2056574 | 3/1981 |
| JP | 61-226572 | 10/1986 |
| JP | H10-238450 | 9/1998 |
| JP | 2005-098233 | 4/2015 |
| KR | 10-20070098300 | 10/2007 |
| WO | WO 2005/012723 | 2/2005 |
| WO | WO 2005/108778 | 11/2005 |
| WO | WO 2007/042793 | 4/2007 |
| WO | WO 2007125307 | 11/2007 |
| WO | WO 2007/139395 | 12/2007 |
| WO | WO 2009/022930 | 2/2009 |

\* cited by examiner

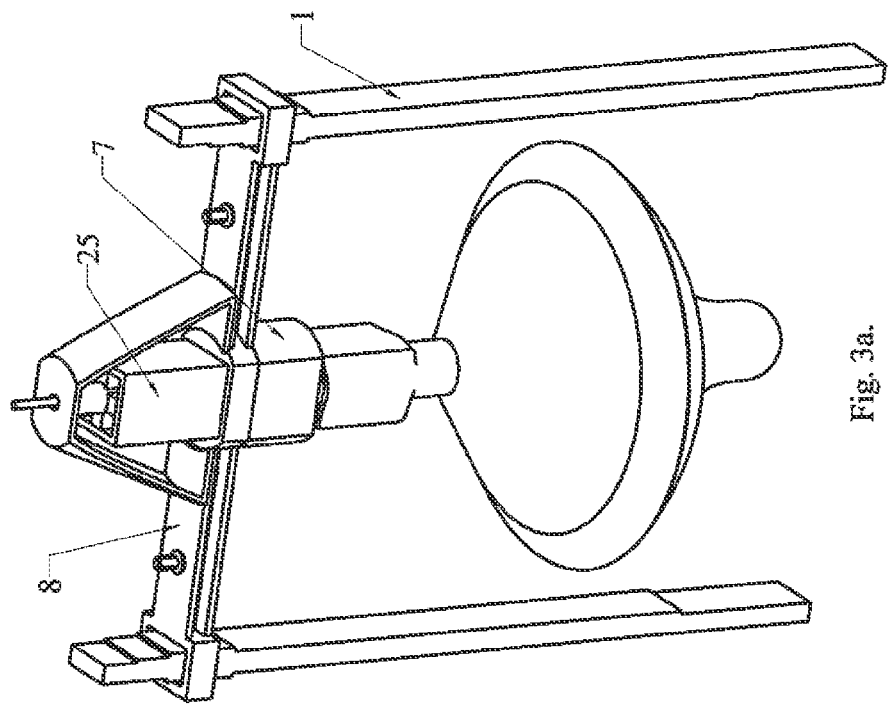
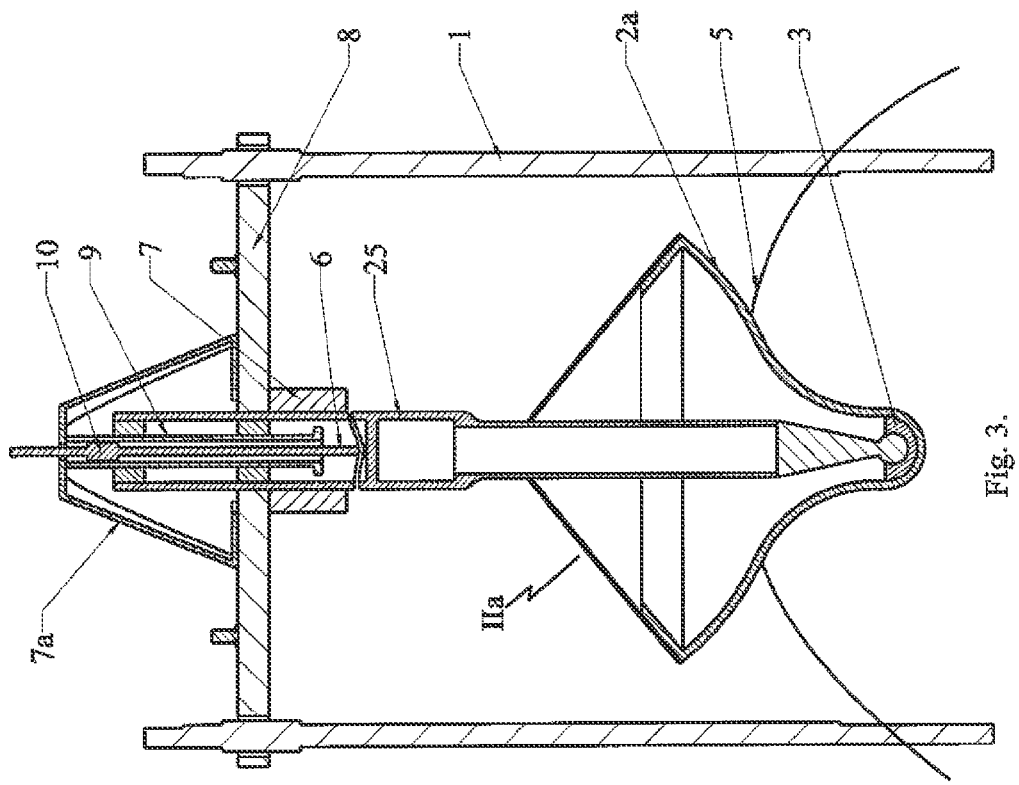
Fig. 3a.
Fig. 3.

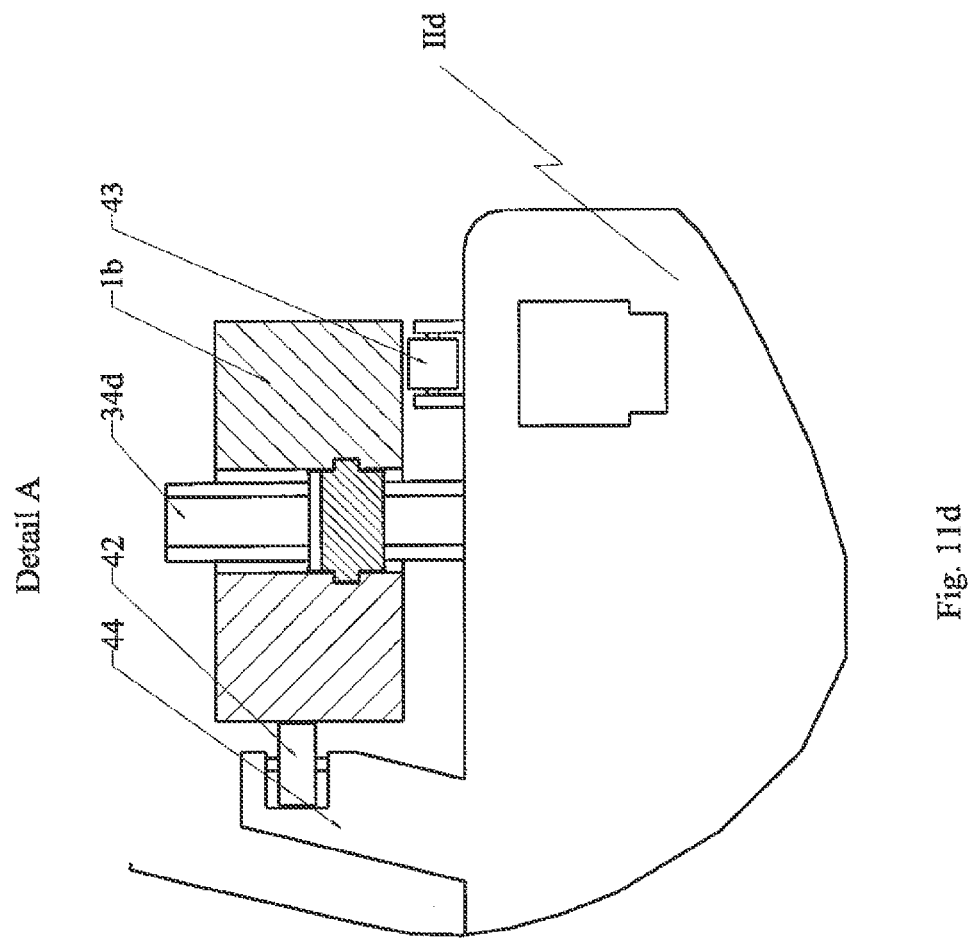

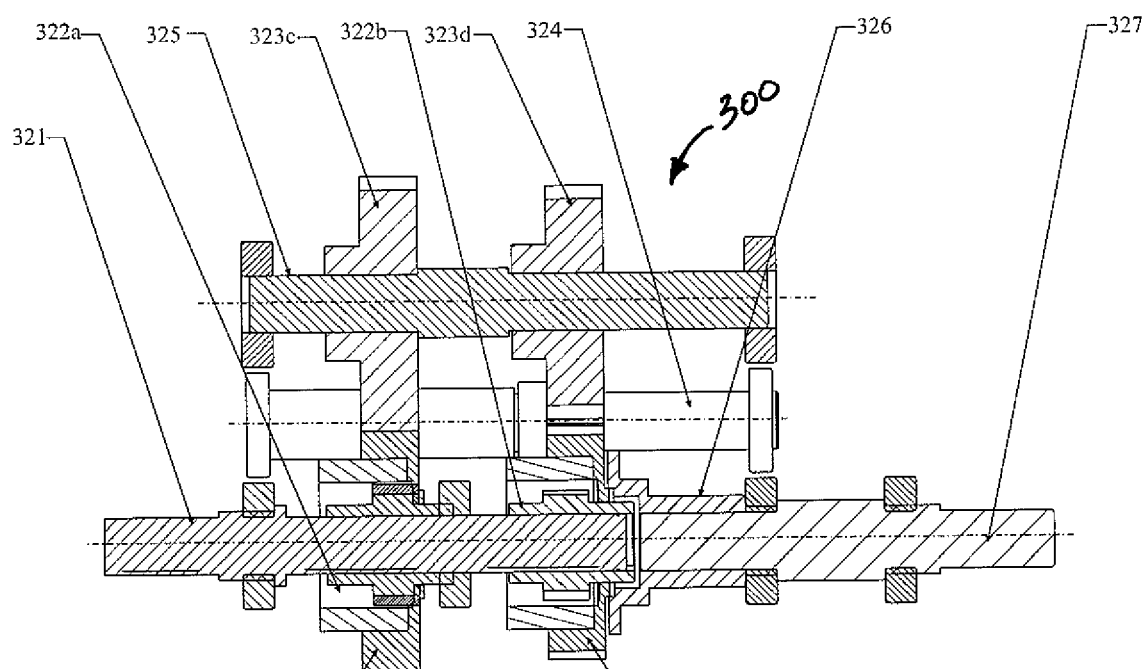
Fig. 15
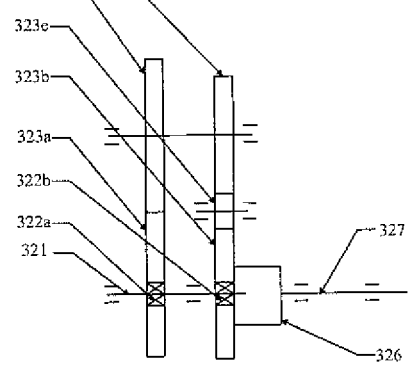
Fig. 15a
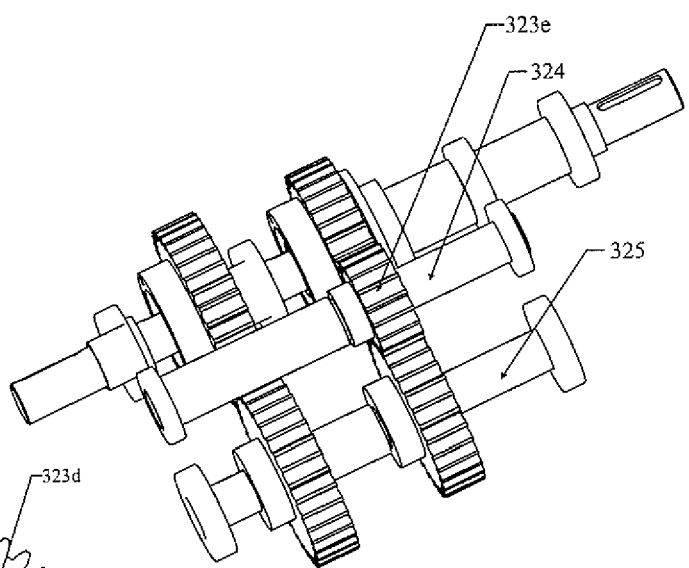
Fig. 15b
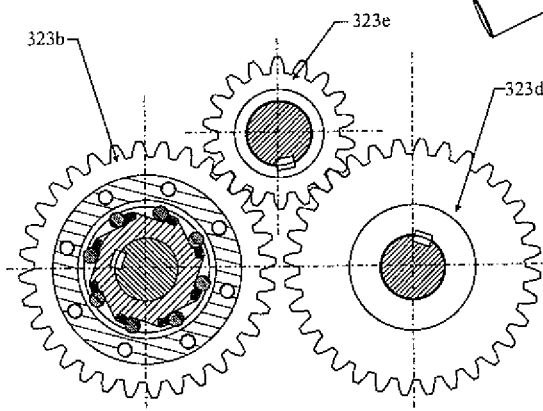
Fig. 15c

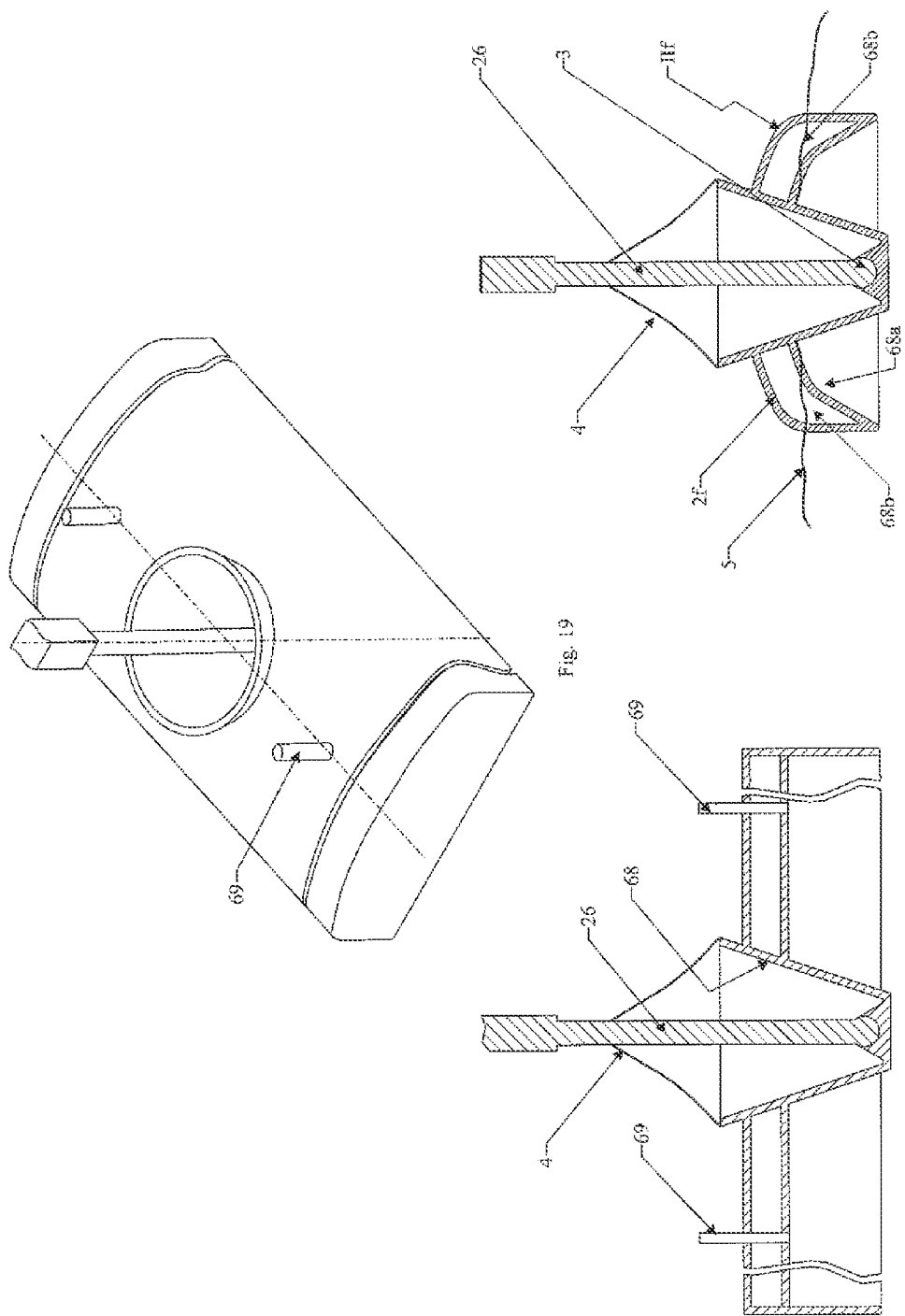

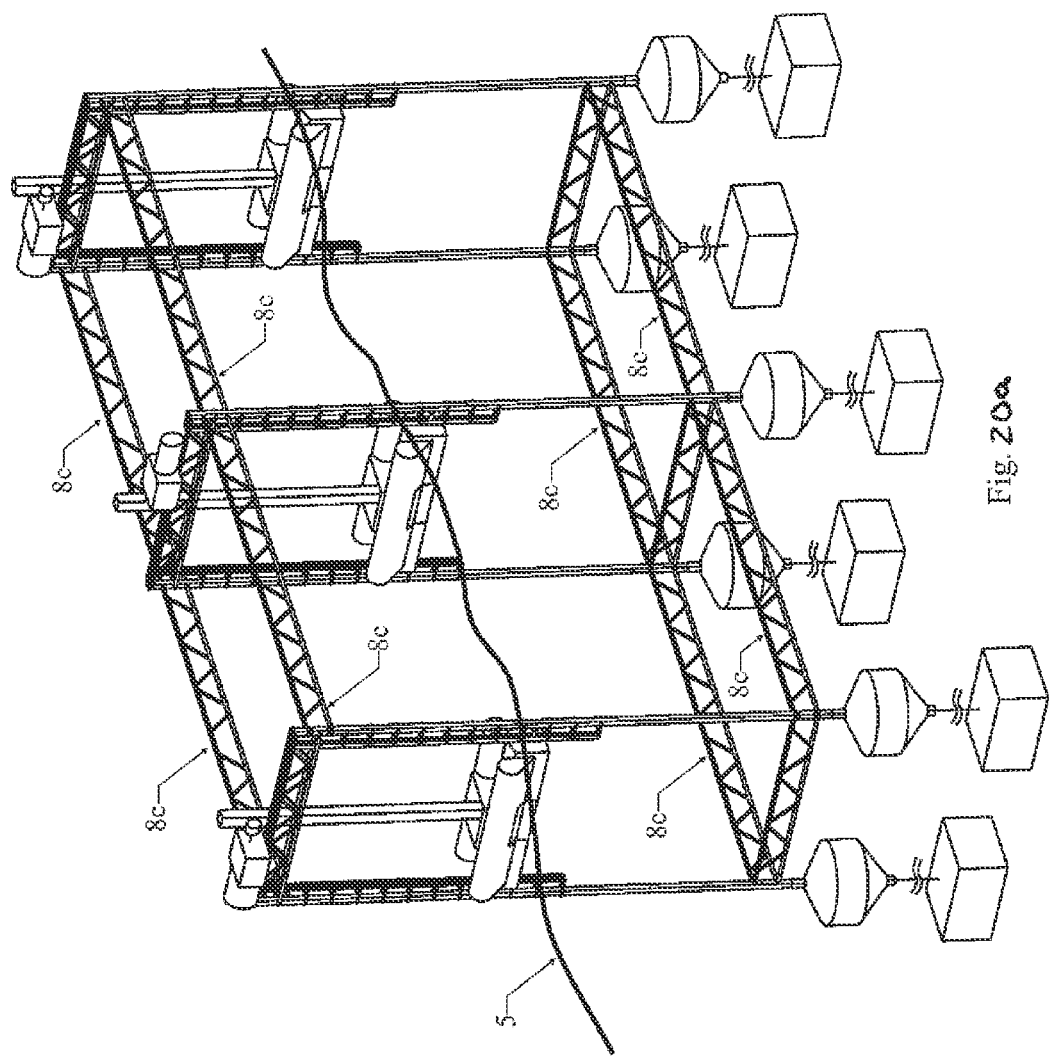

SYSTEM FOR CONVERSION OF WAVE ENERGY INTO ELECTRICAL ENERGY

CROSS-REFERENCE TO RELATED PATENT APPLICATIONS

This application is a Continuation of co-pending U.S. patent application Ser. No. 16/298,825, filed Mar. 11, 2019, which is a Continuation of U.S. patent application Ser. No. 14/681,568, filed Apr. 8, 2015 (now U.S. Pat. No. 10,227,961), which is a Continuation of U.S. patent application Ser. No. 12/606,453, filed Oct. 27, 2009 (now U.S. Pat. No. 9,016,055), which is a continuation-in-part of international patent application Nos. PCT/IB2007/002631, filed Sep. 13, 2007, and PCT/IB2008/003418, filed Dec. 10, 2008. The disclosures set forth in the referenced applications are incorporated herein by reference in their entireties.

BACKGROUND

The present disclosure relates to the utilization of energy from waves and converting the linear motion of waves into operating motion of a generator which then produces electricity. According to the present disclosure, this system uses a floating working body for conversion of linear motion of aquatic waves either into circular or linear motion of the generator.

Technical Problem

The present disclosure gives the answer to the following question: What is the most practical solution for building a system for converting the wave energy into electrical energy?

Technical Conditions

Modern systems for electrical energy production are very expensive, and many of them use fossil fuels which are non-renewable and which pollute the environment a great deal. The Planet is endangered by global warming and the greenhouse effect. This leads to the question of electrical energy production by utilization of natural, renewable wave energy.

Today the energy of waves is not used for production of electrical energy, except experimentally. Power plants are limited by the amount of coal or gas used as operating force for turbines which makes them one of the biggest environmental pollutants. Nuclear power plants are large energy sources but they can be very dangerous if they get damaged (the Chernobyl incident and issues with some plants in the USA). By emitting large amounts of water vapor into atmosphere they increase global pollution; there is also a very serious problem with the nuclear waste disposal.

Alternatively, electricity is produced in electric plants built on dams, rivers, and lakes. However the construction of those plants is complex and expensive. Coastal countries cannot use this source for electricity production. The only solution for these countries is utilization of wave energy. Previous attempts of utilization of wave energy for electricity production have not succeeded due to some particular disadvantages and have not been put in practice.

American U.S. Pat. No. 1,393,472 from the year 1921 was an attempt to use the wave energy by raising and lowering the platform in a very complex way with a large number of gears which caused great energy loss. This resulted in extremely low power output, and because of limited free motion of the platform, possible jamming, bumping and accidents, this patent was never put in practice. The engine of this patent consists of numerous parts and the platform is very heavy with substantial inertia.

There also were some other attempts, such as the U.S. Pat. No. 5,710,464 from 1998, which is an interesting as an example of the utilization of energy from waves for the operation of the pumps for electrical generator supply. In this case, the sea water was driven by the pumps through the pipes to drive the electrical generator.

Likewise, both U.S. Pat. Nos. 4,232,230 and 4,672,222 were the attempts to produce electrical energy by means of linear motion of electromagnets. But the costs of the spare parts production were high; the maintenance was expensive and complex because the induction generator was below water surface which increased the production and exploitation costs.

SUMMARY

The present disclosure is directed to a system for producing electrical energy which enables great efficiency in conversion of aquatic wave motion into electrical generator motion. Devices and components necessary for assembling the system are well-known, inexpensive and can be made or collected in economical production.

In contrast to the previously mentioned U.S. Pat. Nos. 4,232,230 and 4,672,222 where the induction generators are placed under the water surface, in the present disclosure, the induction generator is placed above the water surface, above the floating working body, for example, not below the floating working body as in the US patents mentioned above.

The present energy generating system includes a floating body, a transmission shaft, parts for fixing the system to the sea bottom, and a beam having a generator used for electrical energy production. Contrary to the U.S. Pat. No. 1,393,472 the system for electrical energy production is not placed on the floating body, but on the fixed columns. This way the system for conversion of the linear motion of the floating body into rotary motion is much simpler, with less machine parts; one-way clutches are used (one-way clutch transmits rotating moment only in one direction, not the opposite one). There are no similarities between the present disclosure and other mentioned patents.

The floating body of the system floats on the water and is placed between fixed parts (two or three columns) and, under the action of the waves, moves up and down. The transmission shaft, which can be flexible or inflexible, is fixed to the floating body. The transmission shaft transmits motion to the generator for electrical energy production. Electrical energy can be produced either by use of an induction coil or a generator.

The motion of the magnet in the induction coil is directly related to the motion of the floating body either through the flexible transmission shaft such as a cable or through an inflexible transmission shaft. The induction coil is placed above the water surface and above the working body.

The motion of the magnet in the induction coil is directly related to the motion of the floating body either through the flexible transmission shaft or through the inflexible transmission shaft. The induction coil is placed above the water surface and above the working body. This is, in this case, the simplest way of electrical energy production.

With the generator system the motion or the floating body is converted into circular motion with a minimal loss in the transmission system and a minimal number of machine parts on the generator for producing electrical energy.

In illustrative embodiments, the production of electrical energy from the wave motion can be accomplished without any parts fixed to the bed of the body of water. In this arrangement, the central floating body is surrounded by spaced apart external floating bodies, that when the central floating body is on the valley of the wave, the external floating bodies are on the crest of the wave and vice versa. The central floating body is connected to the device for production of electrical energy, as it has previously been described (a generator or an induction coil with the supporting mechanism). The external floating bodies can laterally extend or retract from the central floating body depending on the lengths of the waves. The distance between the outside floats correspond to the length of the waves, so the maximum utilization of the system is obtained.

BRIEF DESCRIPTION OF THE DRAWINGS

FIG. 3 is one embodiment of the system of FIG. 1;

FIG. 3a is a perspective view of the energy generating system of FIG. 3;

FIG. 11d shows a detail of connecting and reclining of the floating body against the supporting columns, shown from the top;

FIG. 15 shows the cross-section of the mechanism for maintaining the constant direction of rotation;

FIG. 15a is the schematic display of the mechanism for maintaining the constant direction of rotation;

FIG. 15b is an isometric display of the mechanism of FIG. 15;

FIG. 15c is a side elevational view of the mechanism of FIG. 15b;

FIG. 19 is an isometric display of another embodiment of the floating body;

FIG. 19a is the side view of the cross-section of the floating body of FIG. 19;

FIG. 19b shows the front view in cross-section of the floating body of FIG. 19;

FIG. 20a shows multiple floating bodies of FIG. 20; and

DETAILED DESCRIPTION OF THE INVENTION

Figure 1:
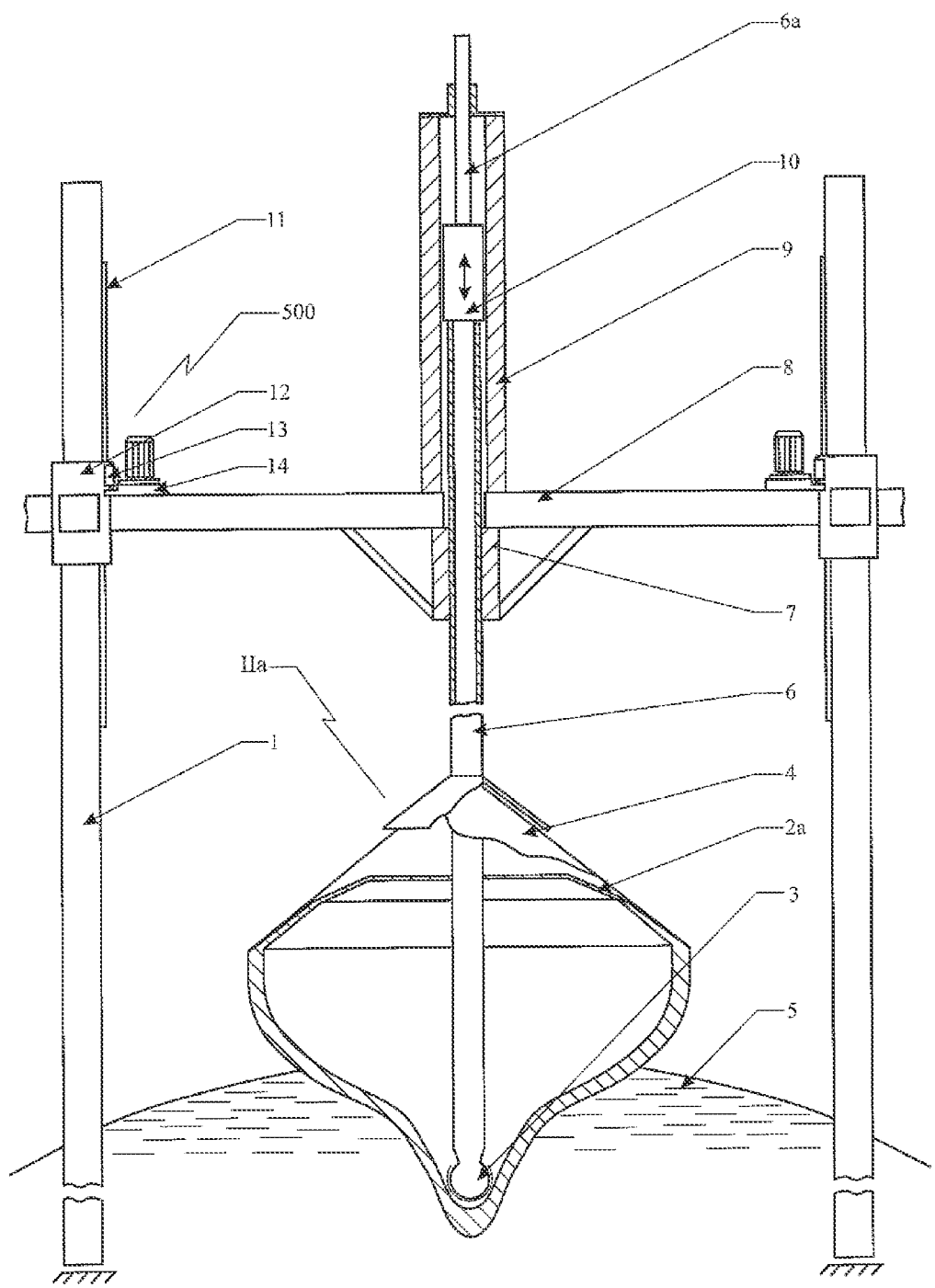
FIG. 1 is a side elevational view of a system for electrical energy production by use of a light floating body according to the present invention.

FIG. 1 shows the electrical energy generating system with the light floating body according to this invention.

The device, essentially, consists of working floating body IIa coupled to an inflexible transmission shaft, in this case, the rod 6, when the working floating body IIa moves vertically under the influence of waves 5 this motion is transmitted through the rods 6 to the magnet 10 which is placed in the induction coil 9, and thus, electrical energy is generated. For keeping the working floating body IIa in the same position, as well as for proper guidance of the magnets 10 within induction coil 9, a guide 7 is built-in.

Due to tidal changes, rod 6 would need to be extremely long. To avoid this, a device 500 was built in order to move the supporting beams 8 by means of a guide 12 along the vertical supporting columns 1. The device 500 consists of an electric motor 15 with a reduction gear 14 to start the jack-screw 13 coupled to the geared lath 11 attached to the supporting column 1. For proper guidance of the rod 6, the addition to the rod 6a above magnets 10 was installed. The device can be constructed in more well-known and adopted ways. It can be driven hydraulically, pneumatically, electromechanically, or it can be the combination of all previously mentioned operations.

Floating working body IIa consists of the base 2a and the waterproof membrane 4, the base 2a has a circular shape, but different shapes are possible, too. Floating working body IIa should be as light as possible, so it can be manufactured from lightweight materials such as a glass plastic combination or fabricated from pneumatic balloons. The floating working body IIa is coupled to the rods 6 by means of a joint linkage 3 which allows the angle of floating working body IIa to change in relation to the rod 6, while the floating working body IIa is rising or lowering under the action of waves 5, with the connection positioned below the central point of displacement. Floating working body IIa has one waterproof membrane 4 used to prevent water from entering into floating working body IIa and to enable pivoting of the floating working body IIa in reaction to the waver.

Rod 6 is coupled to magnet 10 and moves it within the induction coil 9, the induction coil 9 is positioned above the surface of the sea (ocean). Resistance to the movement of magnets 10 within induction coil 9 should be such that the floating working body IIa moves downwardly under its own weight at the same speed as the wave 5 moves downwardly.

Figure 2:
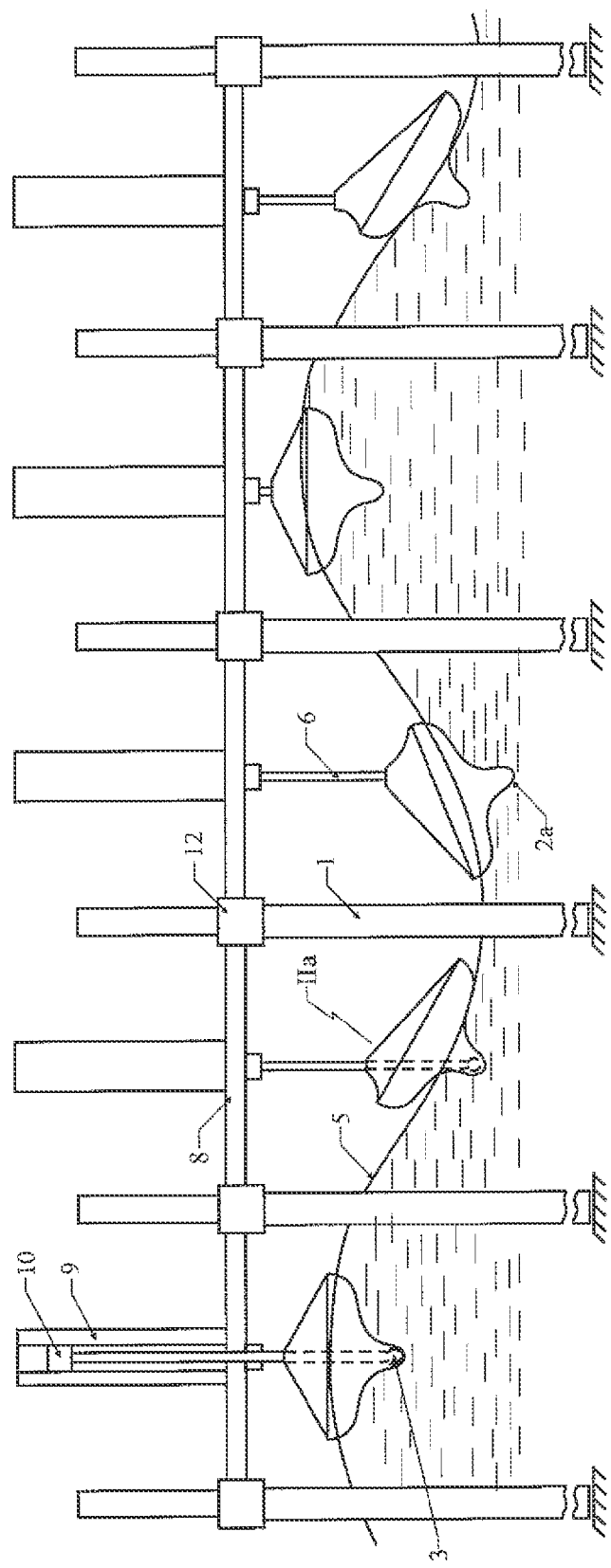
FIG. 2 is a side elevational view of multiple floating bodies that form a energy generating system moving under the influence of the waves.

FIG. 2 is a elevational view of several floating working bodies IIa in motion under the action of waves.

Shown in FIG. 3 is a reinforced embodiment of the device of FIG. 1, suitable for work in difficult conditions (strong, stormy winds, and etc). Load on the bending rods 6 is taken by lattice girder 25, connected by joint 3 to the floating working body IIa, which passes through the guide 7 attached to the supporting beam 8 which can be lowered and raised, along the extension of the supporting columns 1 that are secured to the bottom of the sea (ocean), by a suitable device, for example, a electric motor, a hydraulic device, etc. The induction coil 9 is installed on the bifurcated support 7a, the rod 6, entering the induction coil 9, is attached to the lattice girder 25, with the magnet 10, the motion of the magnet in the induction coil 9 produces electricity.

FIG. 3a is a perspective view of the device of FIG. 3.

Figure 3B:
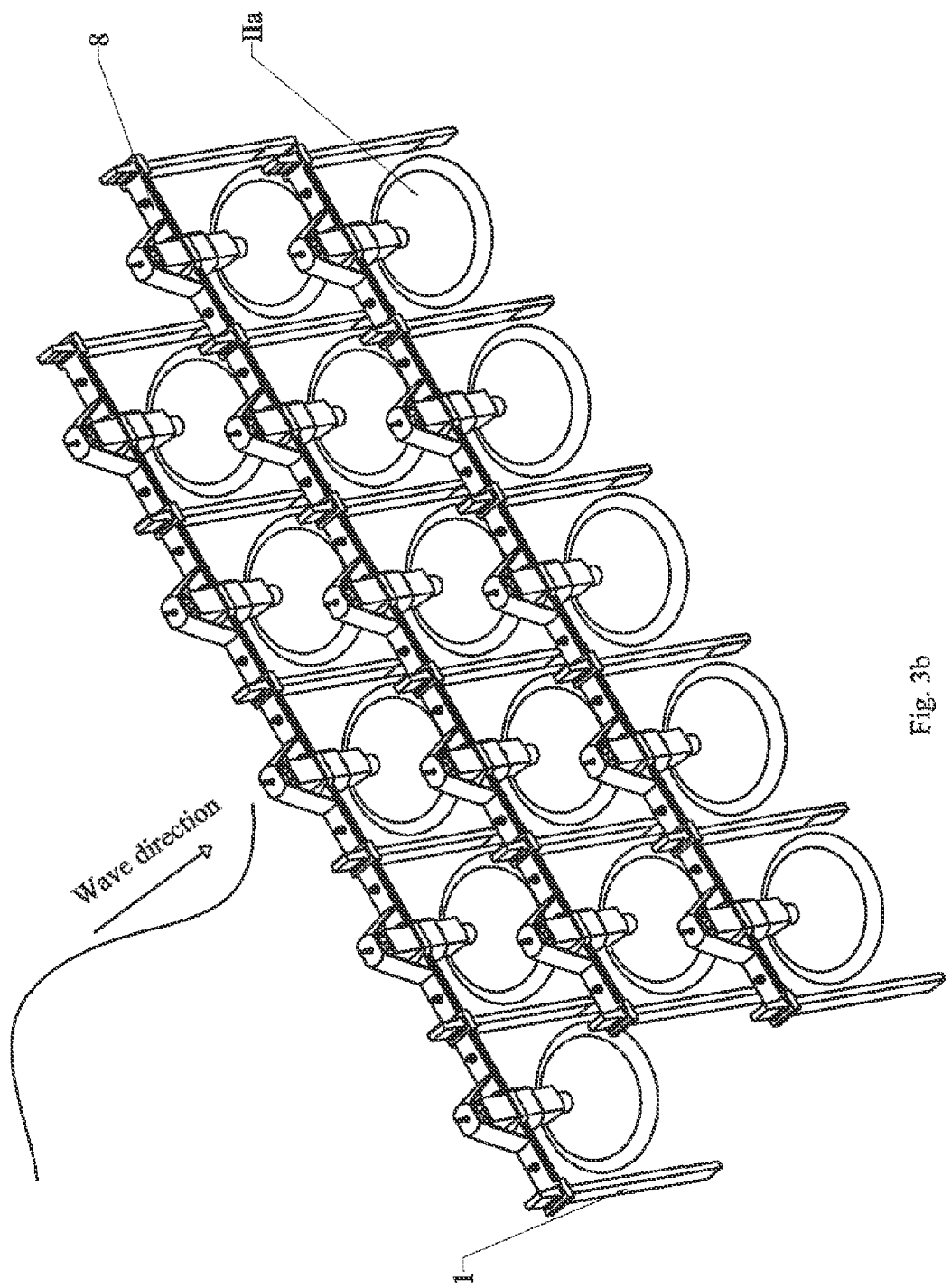
FIG. 3b shows a field of floating bodies and one variation of positioning floating bodies in the direction of the waves and showing the upper beam coupled to two, three or four columns.

FIG. 3b shows one section of the field and one variation of setting floating bodies IIa of FIG. 3 on the direction of the action of waves 5. In FIG. 3b it is visible that the upper beam 8 may be connected to two, three, or four supporting columns 1.

Figure 4:
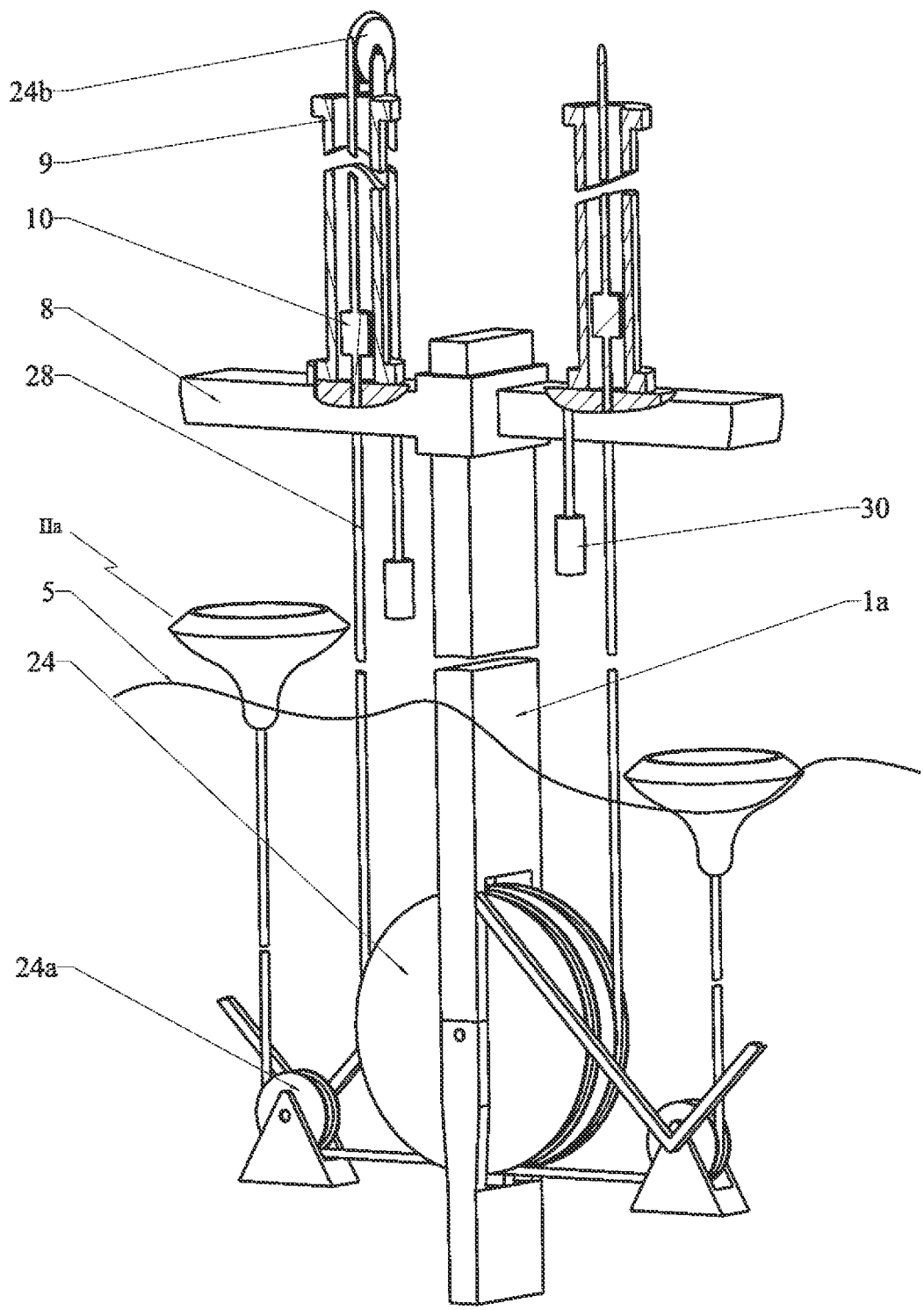
FIG. 4 is another embodiment of the system of FIG. 1, using an induction coil and flexible cable transmission shafts for electric energy generation.

FIG. 4 is another embodiment of the system of FIG. 1. The system, according to FIG. 4, consists of a floating working body IIa that is over flexible transmission shaft 28 connected to the magnet 10 in the induction coil 9, and the flexible transmission shaft 28 goes over one pulley 24 to enter the induction coil 9. Flexible transmission shaft 28 exits the induction coil 9 and through the pulley 24b lowers having a weight 30 at its end. When floating working body IIa begins to lower, weight 30 tightens the flexible transmission shaft 28 and raises the magnet 10 up to the top point. Resistance in induction coil 9 should be such to enable the weight 30 to do its task. Moving of the supporting beam 8 is realized in the described way. In this case two systems can be set on one supporting column 1a.

Figure 5:
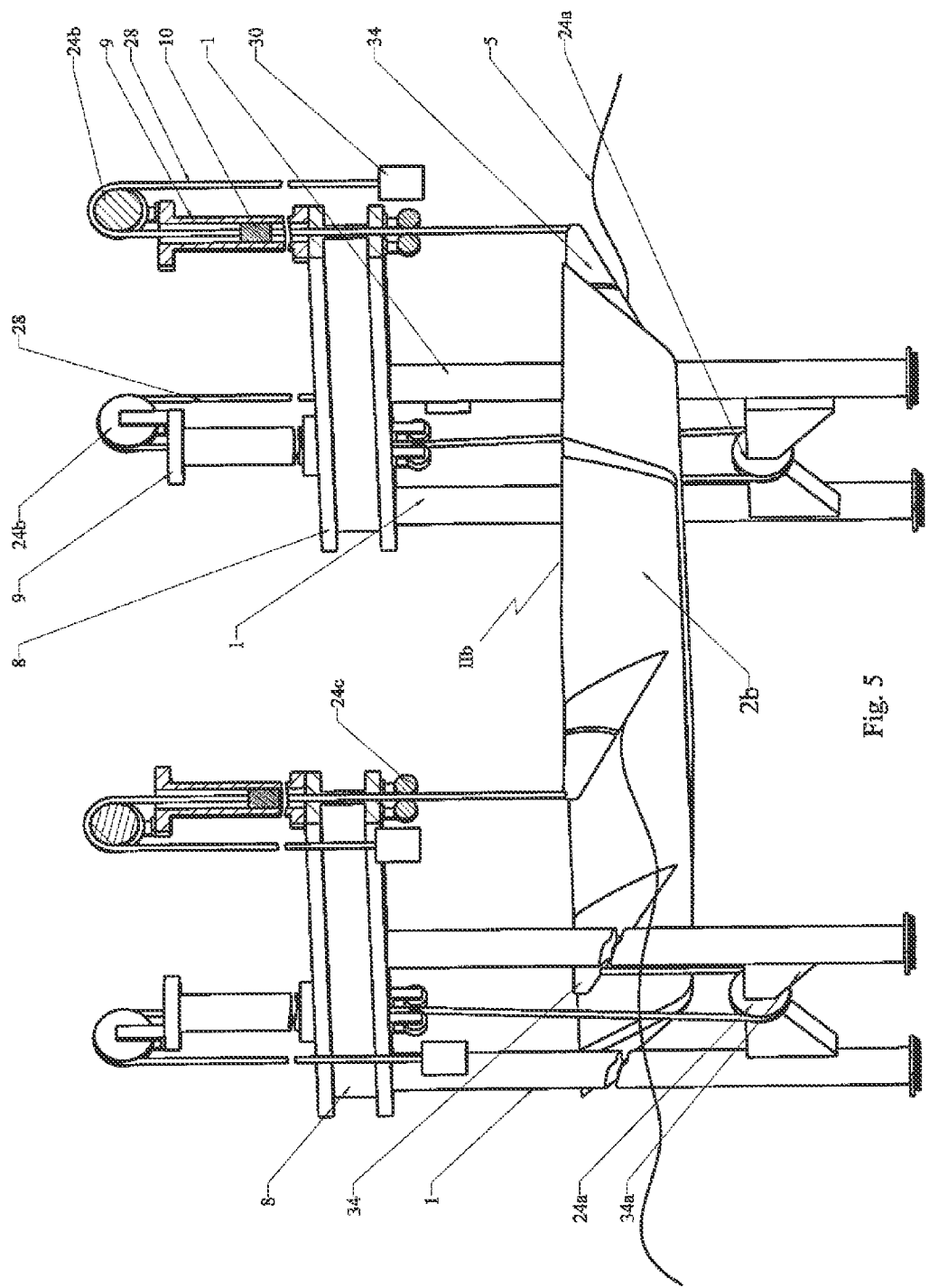
FIG. 5 is an isometric of the system for the production of electrical energy with a large floating body, and linear generators.

FIG. 5 shows another embodiment of the system for conversion of wave energy in the electrical energy in the case of a large floating body. Floating working body IIb consists of the base 2b, which provides the floating body and the brackets 34, which are firmly coupled to the floating body base 2b. Flexible transmission shaft 28, that passes through a pair of pulleys 24c connected to the magnet 10, which is located within the coil 9, and is attached to an end of the brackets 34. The second end of the magnet 10 is also connected by the flexible transmission shaft 28, and at the second end of the flexible transmission shaft 28, which goes over the pulley 24b, a weight 30 is attached. The coil 9 is coupled to the supporting beam 8, which is supported by the supporting columns 1. The electrical power system connected in this way produces electrical energy while the floating working body IIb moves downwards. In the case when the floating working body moves upwards, it is necessary to add a pulley 24a which is connected to the bracket 34a in the rotating way, the brackets 34a are firmly coupled to the supporting columns 1.

Figure 6:
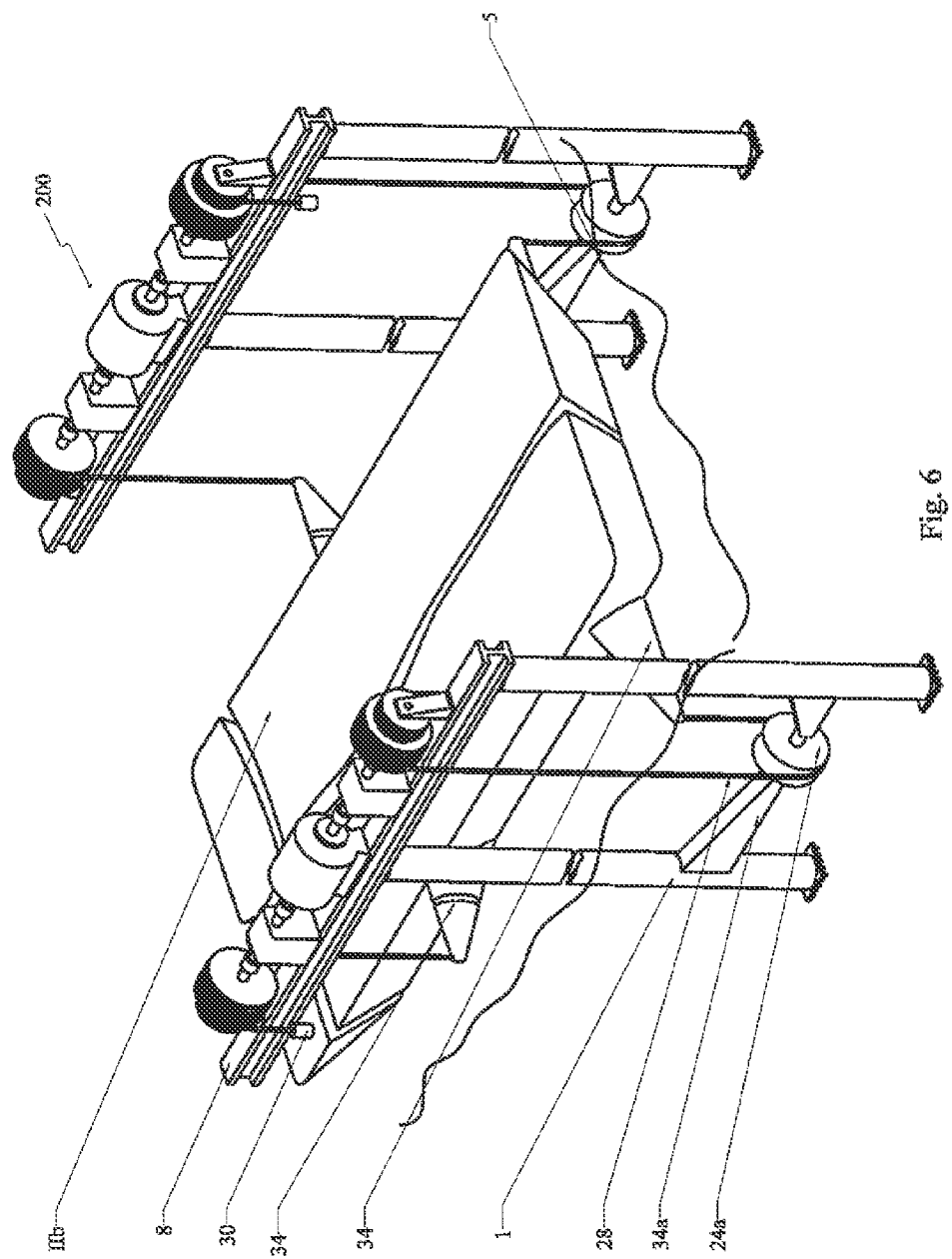
FIG. 6 is an isometric view of another embodiment of the energy generating system with a large floating body and two rotary generators.
Figure 6A:
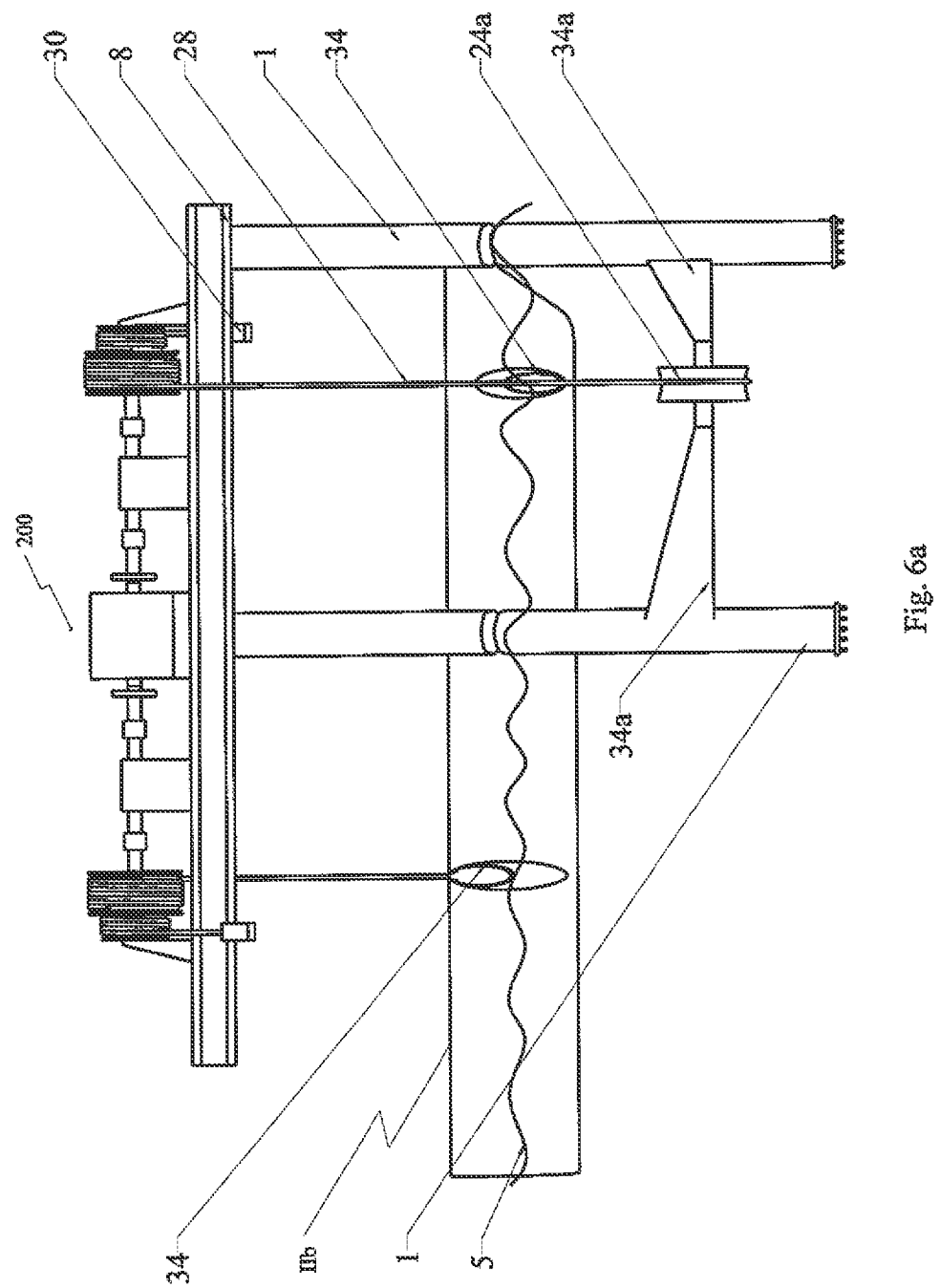
FIG. 6a is an elevational view of an embodiment of the system for the production of electrical energy with a large floating body and a rotary generator.
Figure 6B:
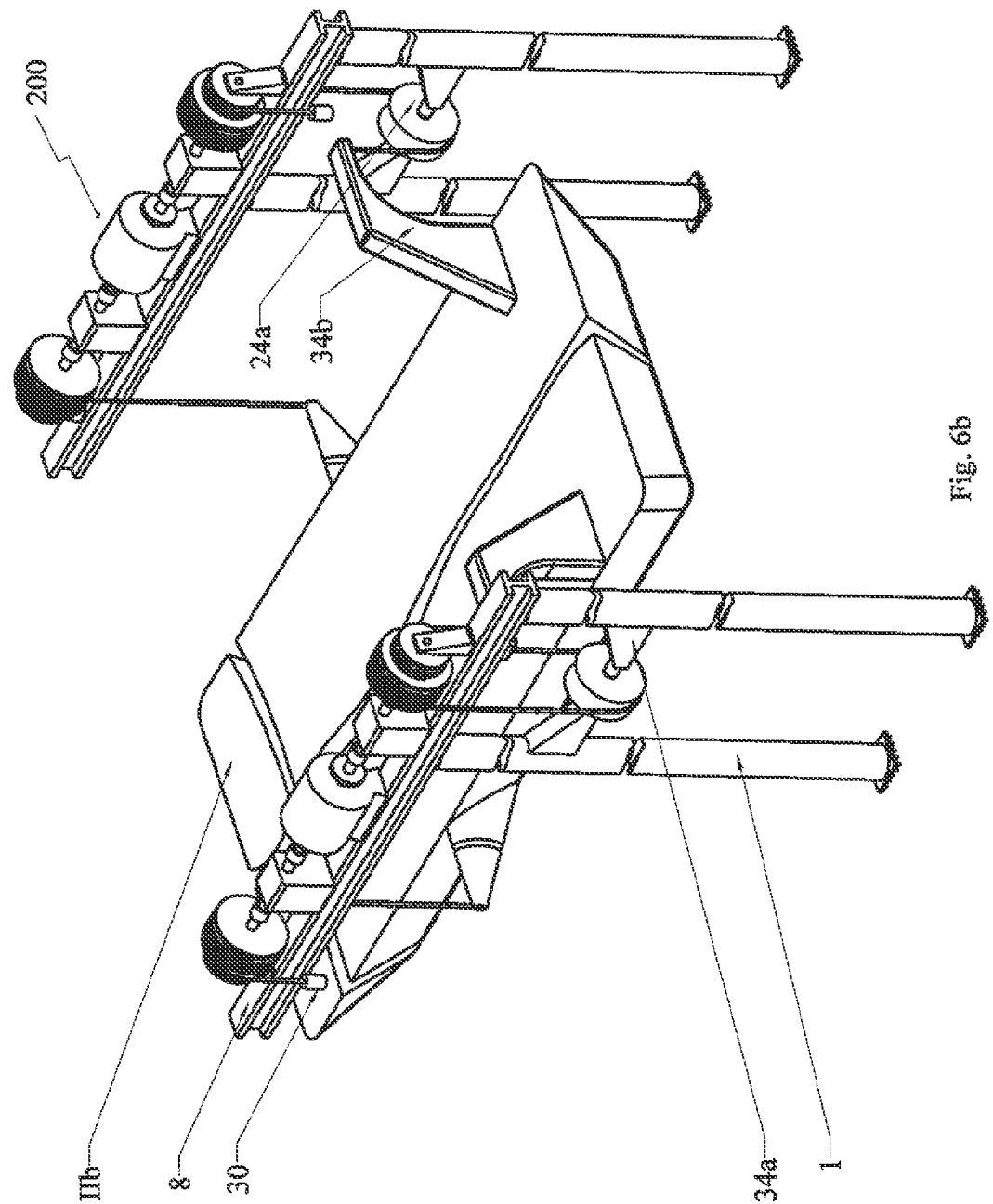
FIG. 6b is an isometric view of the system for the production of electrical energy with a heavy floating body and a rotary generator shown in FIG. 6, an embodiment with combined consoles.

FIG. 6, FIG. 6a and FIG. 6b show a variation of the device shown in FIG. 1 with the large floating working body IIb.

As shown in FIG. 6, the floating working body IIb is much larger than the ones previously described. Vertical motion of the floating working body IIb is transmitted through the flexible transmission shaft 28, mechanism 200 converts this motion into electrical energy.

Floating working body IIb should be positioned in such way so that the waves 5 hit its longer lateral face in order to achieve maximum swing of the floating working body IIb. This means that the length-width ratio is 3÷4:1, and even over 10:1. Floating working body IIb positioned in this way requires minimal force to maintain the position, there is no natural force, which causes swerving and the maximum amplitude of movement can be achieved. In order to improve the exploitation and reduce losses in transmission, brackets 34 can be installed on the floating body, which enable the increase of amplitude of movement and make it easier to keep the distance between the floating working body IIb and inflexible supporting columns 1. Pulley 24a can be placed below the water surface, as shown in the FIG. 6 and FIG. 6a, or above the water surface, as shown in FIG. 6b, in which case the brackets 34b have the shape shown, for example, in FIG. 6b.

Floating working body IIb should be as long as possible, while the width depends on the wave length of the most common place to set the floating working body IIb. It should be sealed on the upper side due to atmospheric precipitation.

Columns 1 are attached to the ocean (sea) bottom. Supporting beams 8 include the devices for converting linear motion of the flexible transmission shaft 28 into rotational motion of the generator 20 are coupled to columns 1.

Figure 6C:
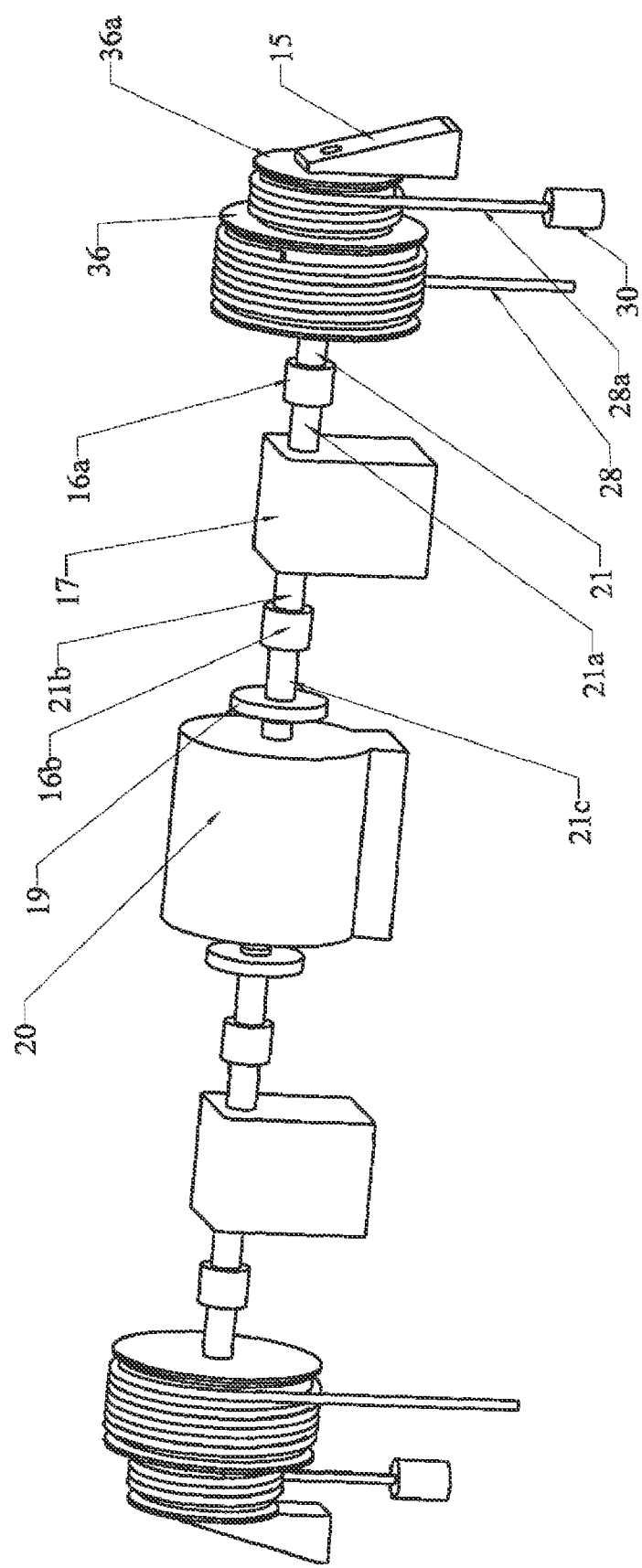
FIG. 6c shows, in enlarged scale, the detail of the pulleys, multiplier and generator for the conversion of linear motion into circular motion and its transmission to the generator.

FIG. 6c shows, in enlarged scale, the electrical energy generating system 200 which includes a pulley 36 for winding the flexible transmission shaft 28. A pulley of a shorter diameter 36a is attached to pulley 36, (these two pulleys can be made as one piece), and the pulley of a shorter diameter 36a is used for winding a steel cable 28a and includes a weight 30, which is adapted to maintain tension in flexible transmission shaft 28. Weight 30 used for maintaining the tension of flexible transmission shaft 28 must be sized-up together with the matching pulley 36a to allow permanent tension of the flexible transmission shaft 28 and avoid collision of any part of the equipment during the highest wave and the highest tide. The whole system is fixed between two profiled supports 15 attached to the beam 8.

Flexible transmission shaft 28 can be a steel cable, a chain, or any other flexible material that can meet the requirements.

Shaft 21 receives the torque from the pulley 36 and over a one-way clutch 16a transmits it to the shaft 21a, which transmits the torque to the multiplier 17 and further through the shaft 21b to a one-way clutch 16b and shaft 21c into generator 20, provided that a flywheel 19 is placed on the shaft 21c. The second part of the device is symmetric. Flywheels 19 are optional because the function of the flywheel 19 can be realized by the multiplier 17, thereby the clutch 16a should be left out. Multiplier 17 includes a set of gears that causes shaft 21b to rotate faster than shaft 21a.

Figure 7:
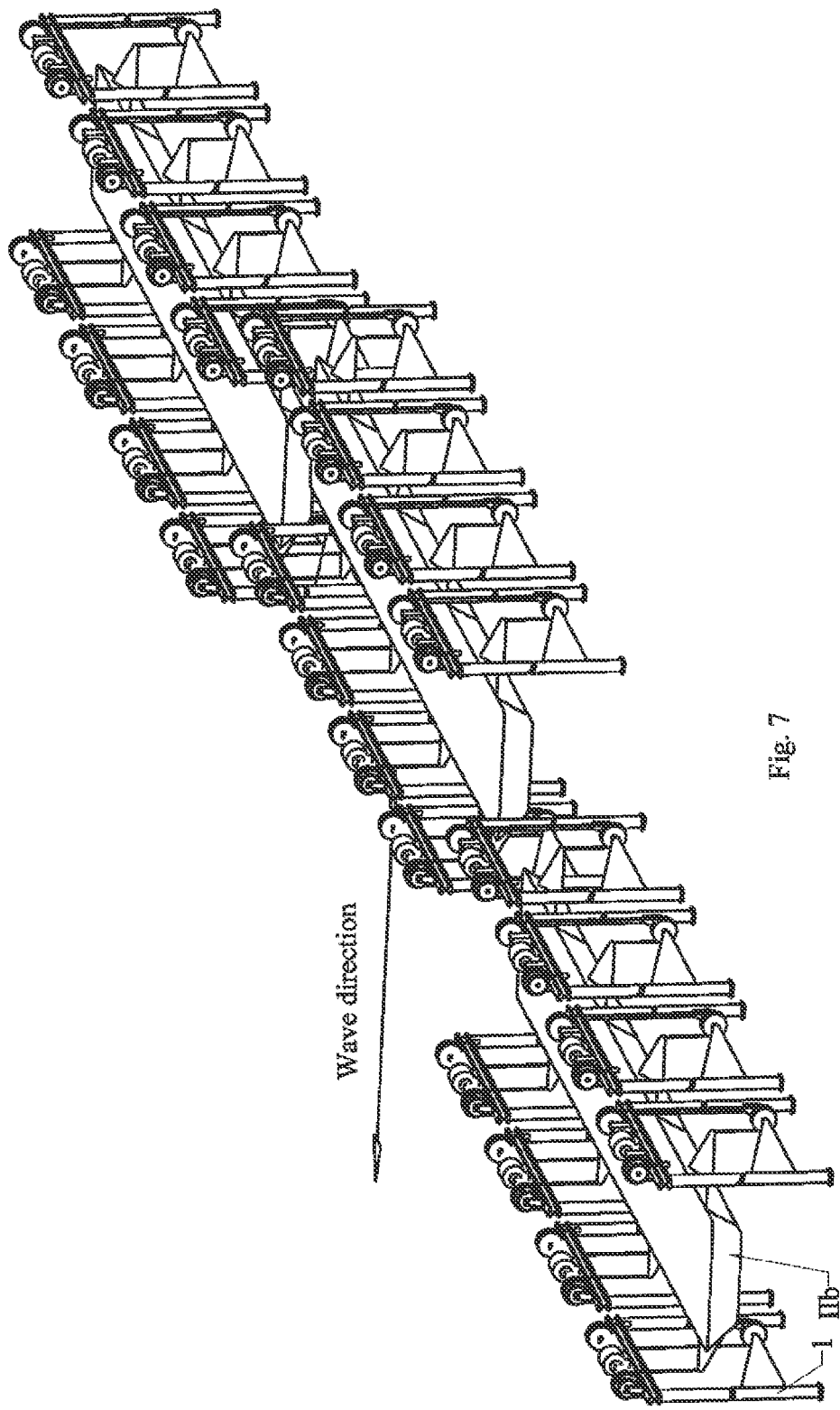
FIG. 7 shows the way to position the system in the direction of the action of waves and showing multiple large floating bodies.

FIG. 7 shows a method to set the previous system in the direction of the action of the waves.

Figure 8:
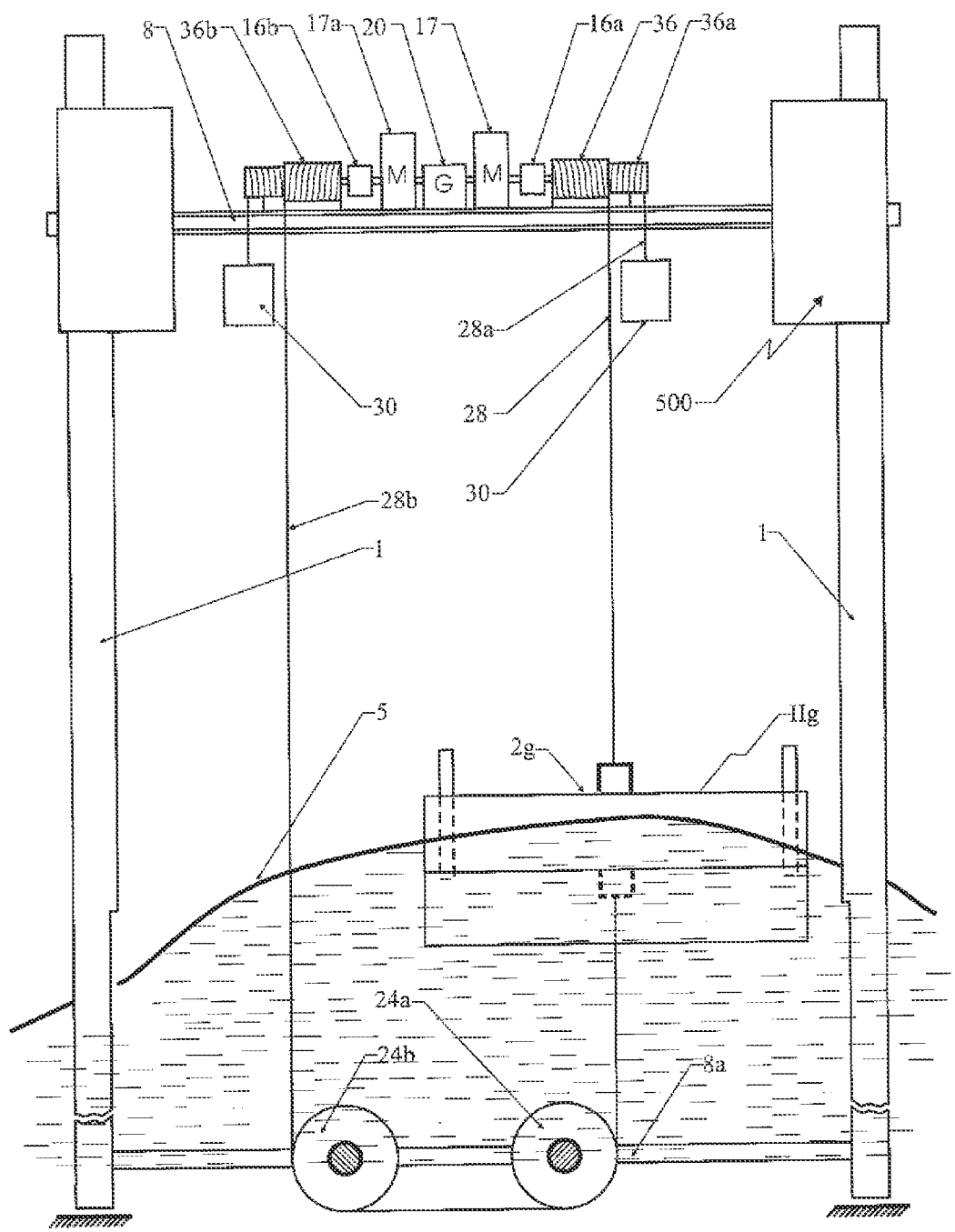
FIG. 8 shows another embodiment of the system for the production of electrical energy using the flexible transmission shaft, and an overhead rotary generator.

FIG. 8 shows floating working body IIg with a cover coupled, by means of flexible transmission shaft 28, to the pulley 36 to which a flexible transmission shaft 28 is wound. The base 2c is, by means of flexible transmission shaft 28b and over intermediate pulleys 24a and 24b, coupled to the drive pulley 36b to which a flexible transmission shaft 28b is wound. Counterweights 30 ensure permanent tension of flexible transmission shafts 28 and 28b. Pulleys 24a and 24b are firmly pivoted to the additional beams 8a. Generator 20, multipliers 17 and 17a, one-way clutches 16a and 16b and pulleys 36 and 36b are firmly connected to the supporting beam 8 Supporting beam 8 is coupled to the mechanisms 500 which allow vertical movement of the beam 8 along the columns 1 in order to compensate for the tides.

When wave 5 raises the floating working body IIg, flexible transmission shaft 28b transmits the movement through intermediate pulleys 24a and 24b, to pulley 36b, which rotates due to unwinding of the flexible transmission shaft 28b and transfers torque through the one-way clutch 16b and multiplier 17a further to the generator 20. When the floating working body IIg moves towards water, unwinding of the flexible transmission shaft 28 rotates the pulley 36 which through one-way clutch 16a and multiplier 17 transmits torque to the generator 20. Alternate work of one-way clutches 16a and 16b causes the generator shaft 20 to always rotate in the same direction regardless from which side it gets the drive. Pulley 24b can be placed in the column 1 axis. Floating body IIc is suitable for low waves 5 with short length.

Figure 9:
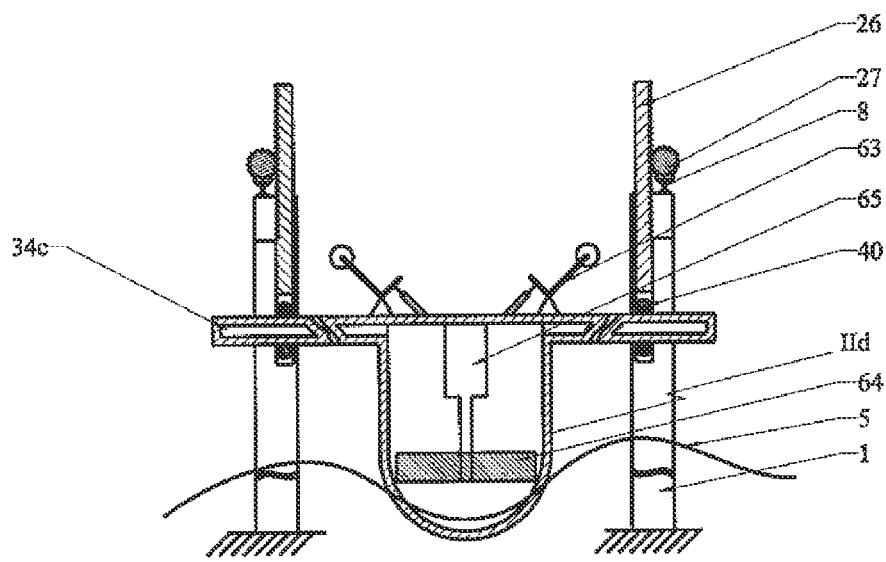
FIG. 9 is a sectional view of another embodiment of the system for converting aquatic wave movement into electrical energy.

Another embodiment of the system for conversion energy of aquatic waves in the electrical energy is shown in FIG. 9. The shape of the floating working body IId is a bit different in order to be used for short waves. To increase the amplitude of lateral swinging, and effective work, additional mass 64, which shifts along the vertical axis of the floating working body IId, is added depending on the size of the waves. In this way the position of barycentre (the center of mass) is changed and at the same time the amplitude of lateral movement, so the output power of the generator increases. Shifting of the additional mass 64 along the vertical axis is carried out, as shown in FIG. 9, using the hydraulic cylinders 65, although the drivers may be pneumatic, or electromechanical or combinations thereof. In order to prevent possible capsizing of floating working body IId a device 63 is installed to control and restrict its motion. A bracket 34c of the floating working body IId pushes back two racks 26 that are coupled to the gears 27 of the energy generating system, the device is shown in detail in FIG. 10.

Figure 9A:
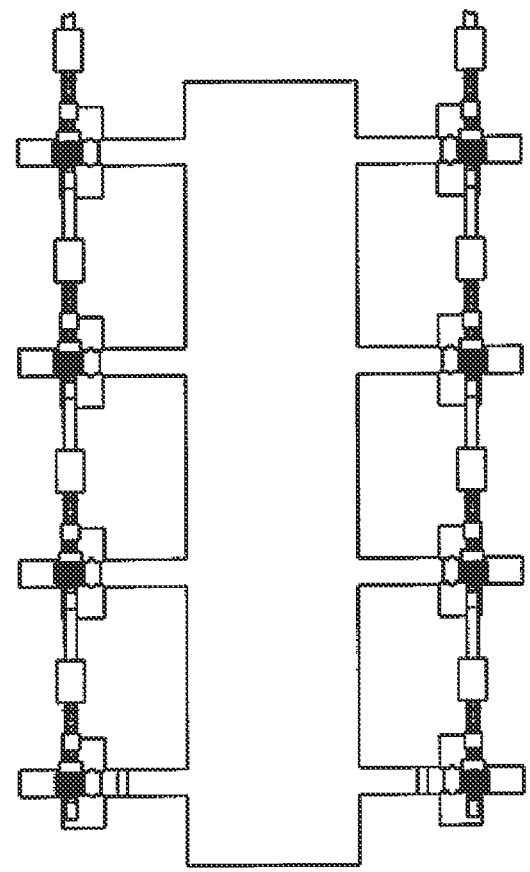
FIG. 9a is a top view of the energy generating system of FIG. 9.

FIG. 9a shows a possibility of choosing the size of the floating working body IId which means that it is possible to install more systems for transformation of rotary motion into circular motion and the production of larger quantities of electricity.

Figure 10:
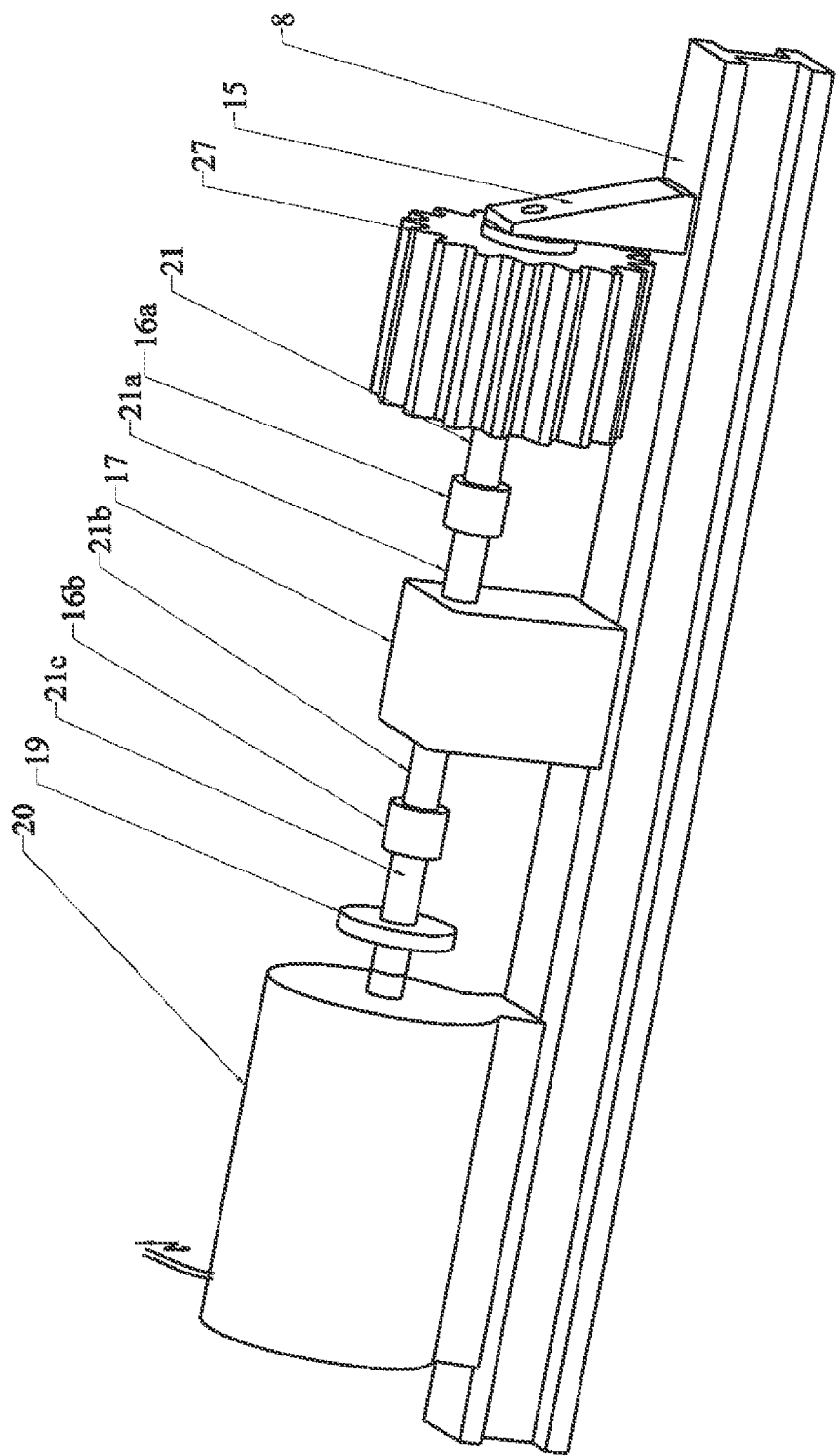
FIG. 10 is a perspective view showing in detail the system for converting linear motion into rotary motion.

According to FIG. 10, the vertical gear rack 26 that is part of an inflexible transmission shaft is coupled to the gear 27 that converts linear motion of the gear rack 26 into circular motion, which is transmitted to a one-way clutch 16a over the shaft 21, and from the one-way clutch 16a force is transmitted through the shaft 21a to multiplier 17, which increases the number of revolutions, and achieved torque is transmitted further to the shaft 21b, and through one-way clutch 16b and shaft 21c to the generator 20 that generates electrical energy. A flywheel 19 is used to maintain the rotation of the generator 20 after the termination of the effect of the torque. The flywheel is coupled to the shaft 21c in front of the generator 20. In order to achieve work in both directions of gear rack 26 motion, instead of one-way clutch, one of the variations of mechanism 300 can be installed (The variations of mechanism 300 are described in the FIG. 16, FIG. 17 and FIG. 18).

Figures 11, 11A:
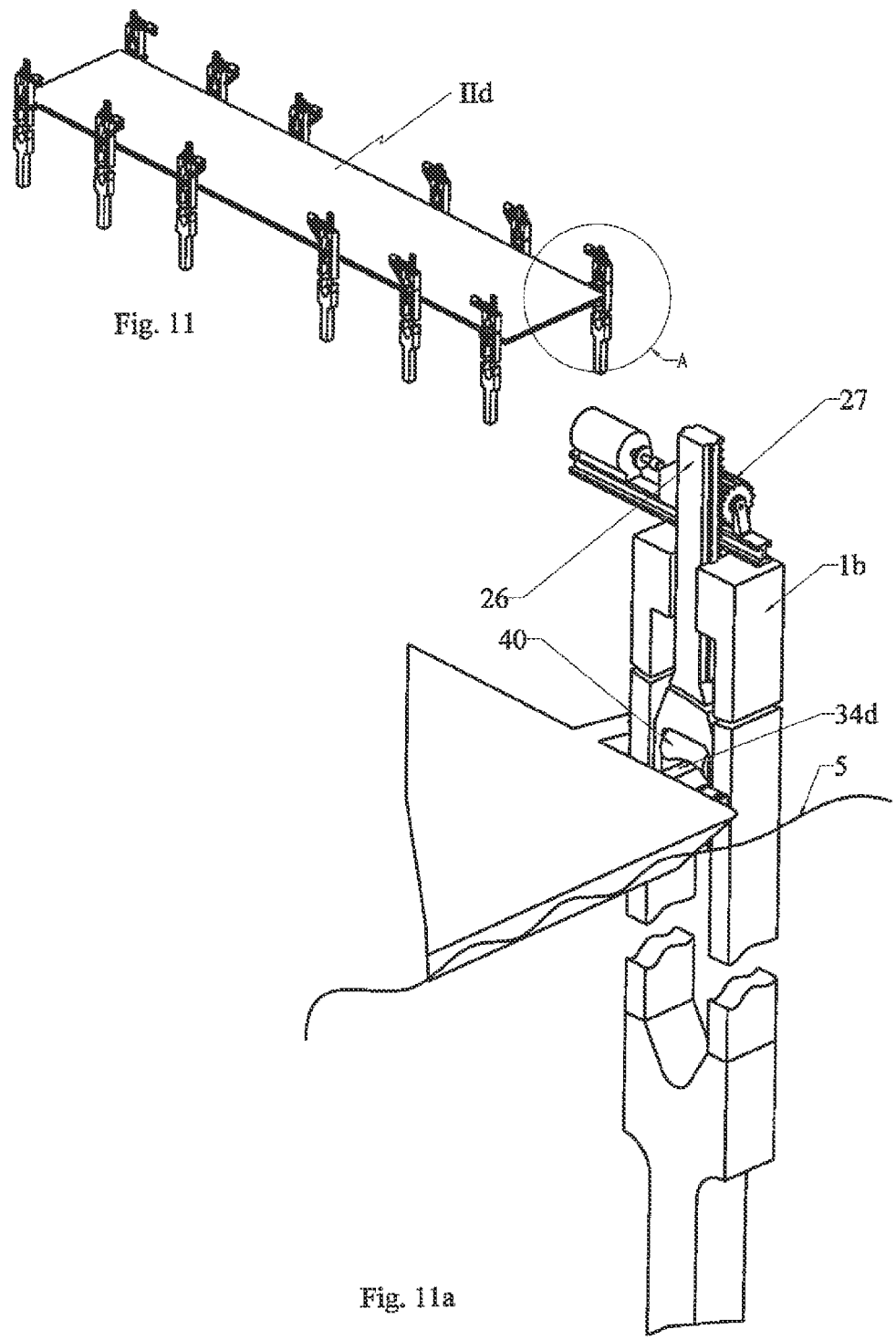
FIG. 11 is an isometric view of an embodiment with a large floating bodies and multiple inflexible transmission shafts.
FIG. 11a shows an enlarged isometric view of inflexible transmission shaft of FIG. 11 connected to the floating body.
Figure 11B:
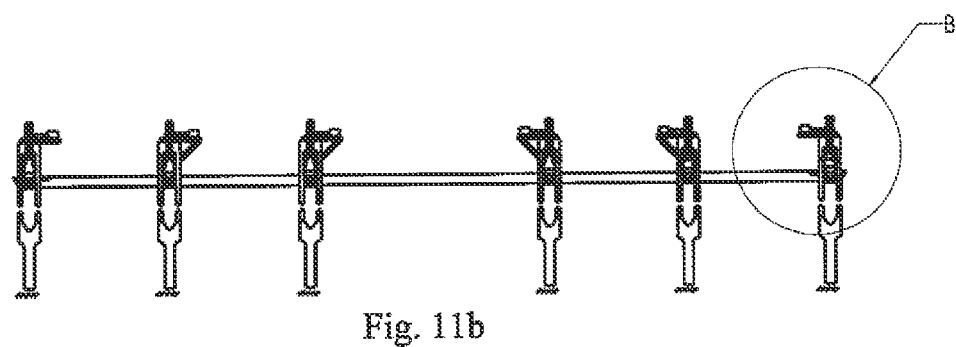
FIG. 11b is a side view of the system of FIG. 11.
Figure 11C:
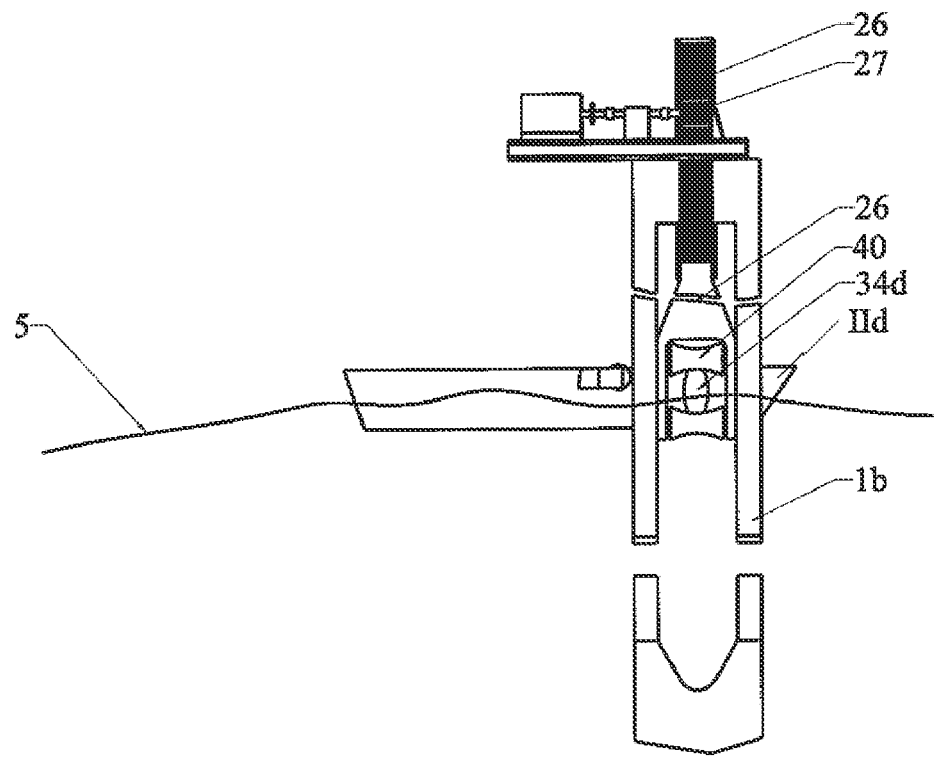
FIG. 11c is a detailed side view of FIG. 11 showing the inflexible transmission shaft connected to the floating body.

FIG. 11a and FIG. 11c show the connection of electricity generating system and floating working body IId, which is established by means of a gear rack 26. To increase the amplitude of floating working body IId motion, a bracket 34d that is positioned between a pair of profiled cylinders 40, has been built-in. In FIG. 11a it is shown that profiled cylinders 40 can be narrower in the middle and wider at the end, as shown in the above mentioned figure. This enables self-alignment of the floating working body IId. Profiled cylinders 40 may have different diameters, but should not exceed the bending limit of bracket 34d. Profiled cylinders 40 permanently overlap bracket 34d in order to avoid impact load. This can be realized, for example, by using the spring system in the base of the supporting column 1b so that profiled cylinders 40 are biased toward brackets 34d.

Floating working body IId with brackets 34d on its external end, which, using profiled cylinders 40, provide the correct overlapping of the gear rack 26 on the gear 27, which converts linear motion of gear rack 26 into rotary motion of the electrical energy generating system 200. Floating working body IId should be provided with at least four clampers 44 (FIG. 11d), which should prevent bracket 34d from colliding with the supporting column 1b outside profiled cylinders 40 and thus, prevent the bracket 34d to exceed the bending limit. Cylinder (or ball) 42 should have a flexible support in the damper 44. Clampers 44 including roller*cylinder 44) to roll along the vertical side surface of column 1b. The clampers 44 should be designed is such way to hold the floating working body IId in operating position during conditions of strong winds, waves, etc. A spacer 43 that together with the clamper 44 maintains the floating working body IId in the operating position is shown in FIG. 11d. Gear rack 26 includes guide track 26(a) to maintain vertical alignment of gear rack 26.

Figure 12:
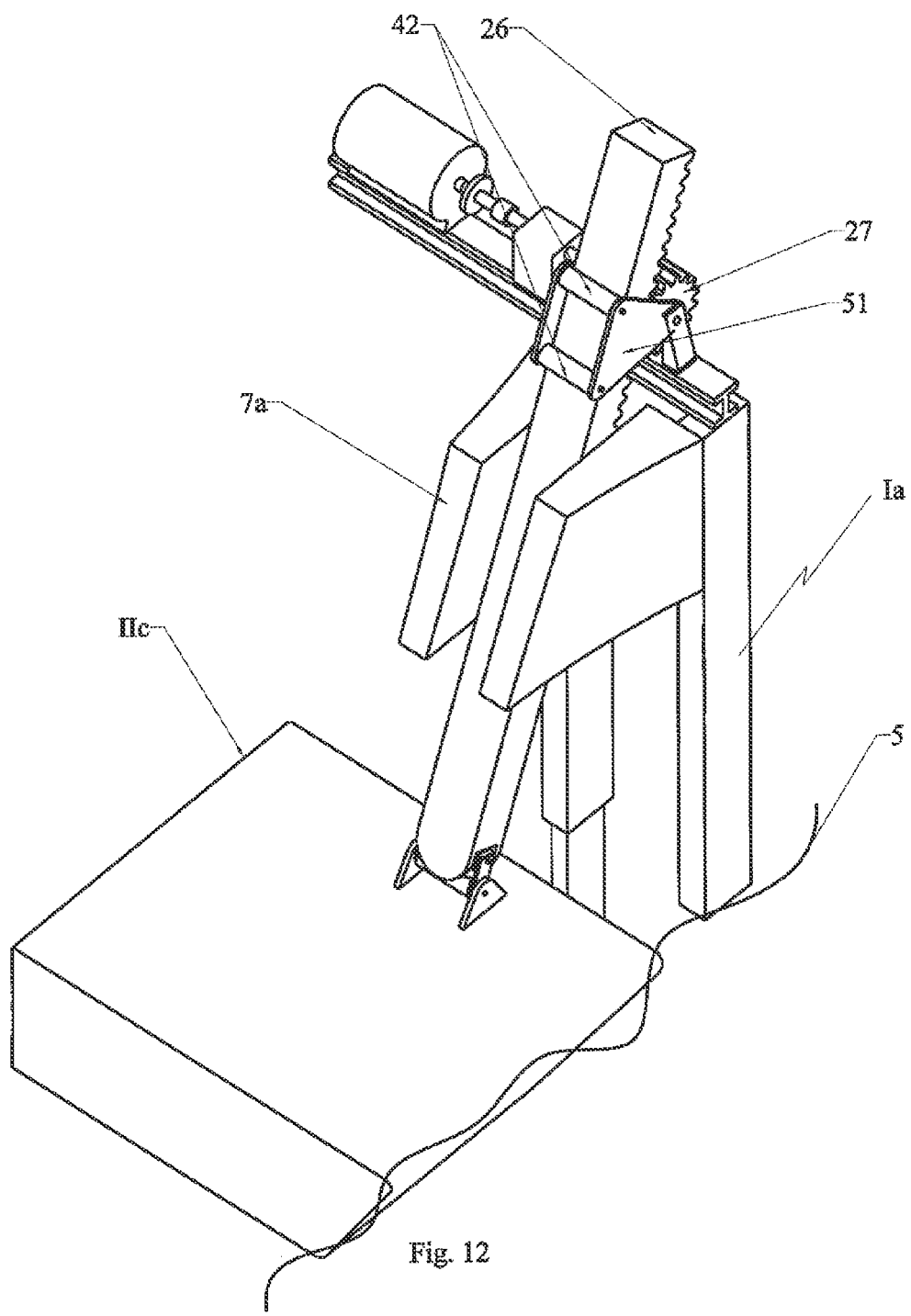
FIG. 12 shows the isometric view of another variation of inflexible transmission shaft connected to the floating body.

Another embodiment of the system for conversion aquatic wave energy into electrical energy is shown in FIG. 12, FIG. 12a, FIG. 12b, FIG. 12c and FIG. 12d. FIG. 12 shows a part of floating working body IIc with a gear rack 26 attached to it. Unlike the previous embodiments, the movement of the floating working body IIc is transferred to the gear rack 26 through arc prisms 55 and 55a, (FIG. 12c), and the cylinder 42a, which is connected to the gear rack 26. Electrical energy is generated by the motion of the gear rack 26.

Figure 12A:
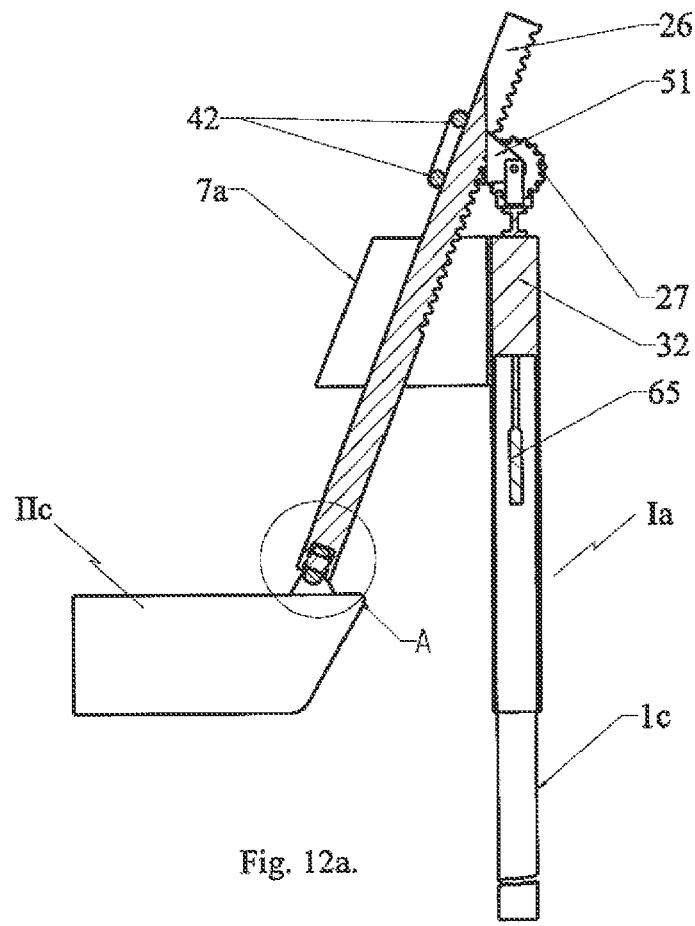
FIG. 12a is a sectional view of the variation of connecting the inflexible transmission shaft to the floating body shown in FIG. 12—the sectional view showing a telescopic column.
Figure 12C:
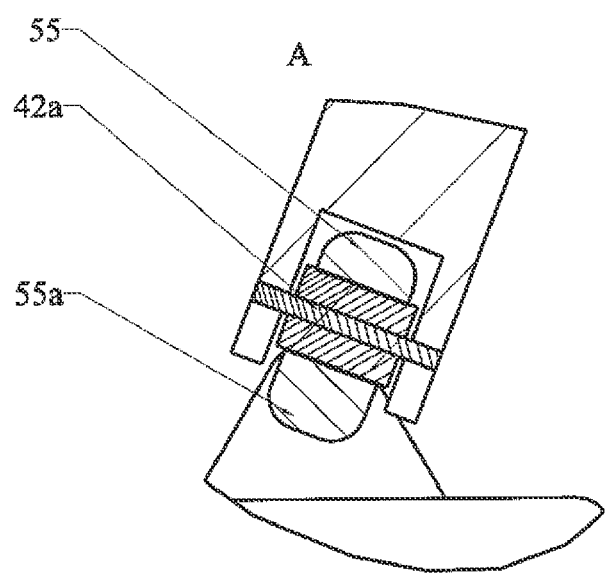
FIG. 12c is a detailed sectional display of inflexible transmission shaft and floating body connection.
Figure 12B:
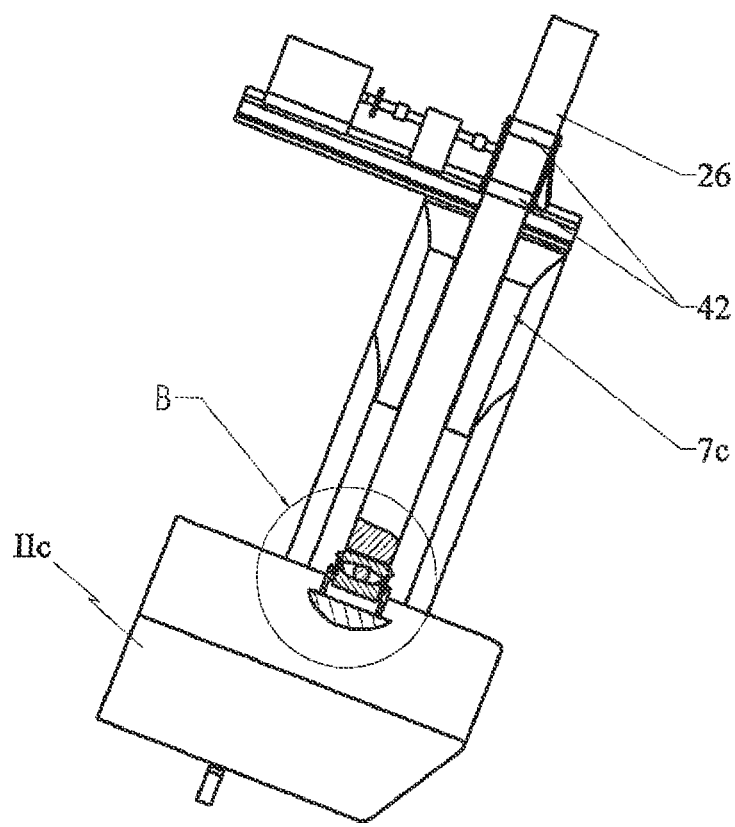
FIG. 12b shows the cross-section in the plane normal to the plane of the cross-section of the FIG. 12.
Figure 12D:
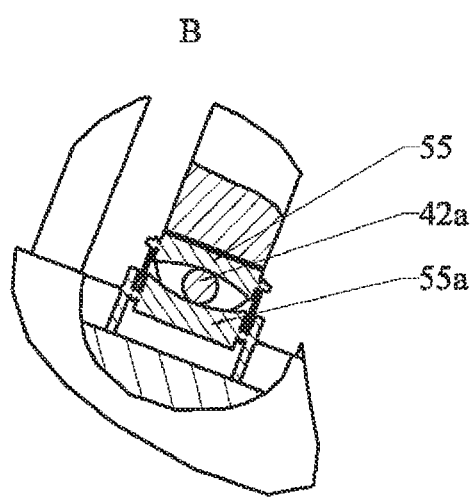
FIG. 12d is a detailed sectional display of inflexible transmission shaft and floating body connection.

FIG. 12a shows a direct connection of the gear rack 26 with the floating working body IIc. In this embodiment the support 51, in the shape of a stirrup, enables gear rack 26 to overlap the gear 27. In this case, the support 51, which is pivoting around the same axis as gear 27, has two cylinders 42 which overlap the gear rack 26. To avoid lateral shifting of the gear rack 26 the gear rack 26 is positioned between guides 7a. attached to the column Ia. The guides 7a receive lateral forces and allows gear rack 26 to move towards the telescopic column Ia and away from telescopic column Ia. Self-alignment can be achieved by means of arc prisms 55 and 55a, as shown in details "A" and "B" in FIG. 12c and FIG. 12d.

FIG. 12a is the cross-section of the telescopic column Ia, which consists of the supporting column base 1c, a hydraulic cylinder 65 and the supporting column mantle 32. Hydraulic cylinder 65 can change the height of the column Ia, depending on the tides, to reduce the overall length of the rack 26 The system for electric power generation is described in the previous Figure.

Figure 13:
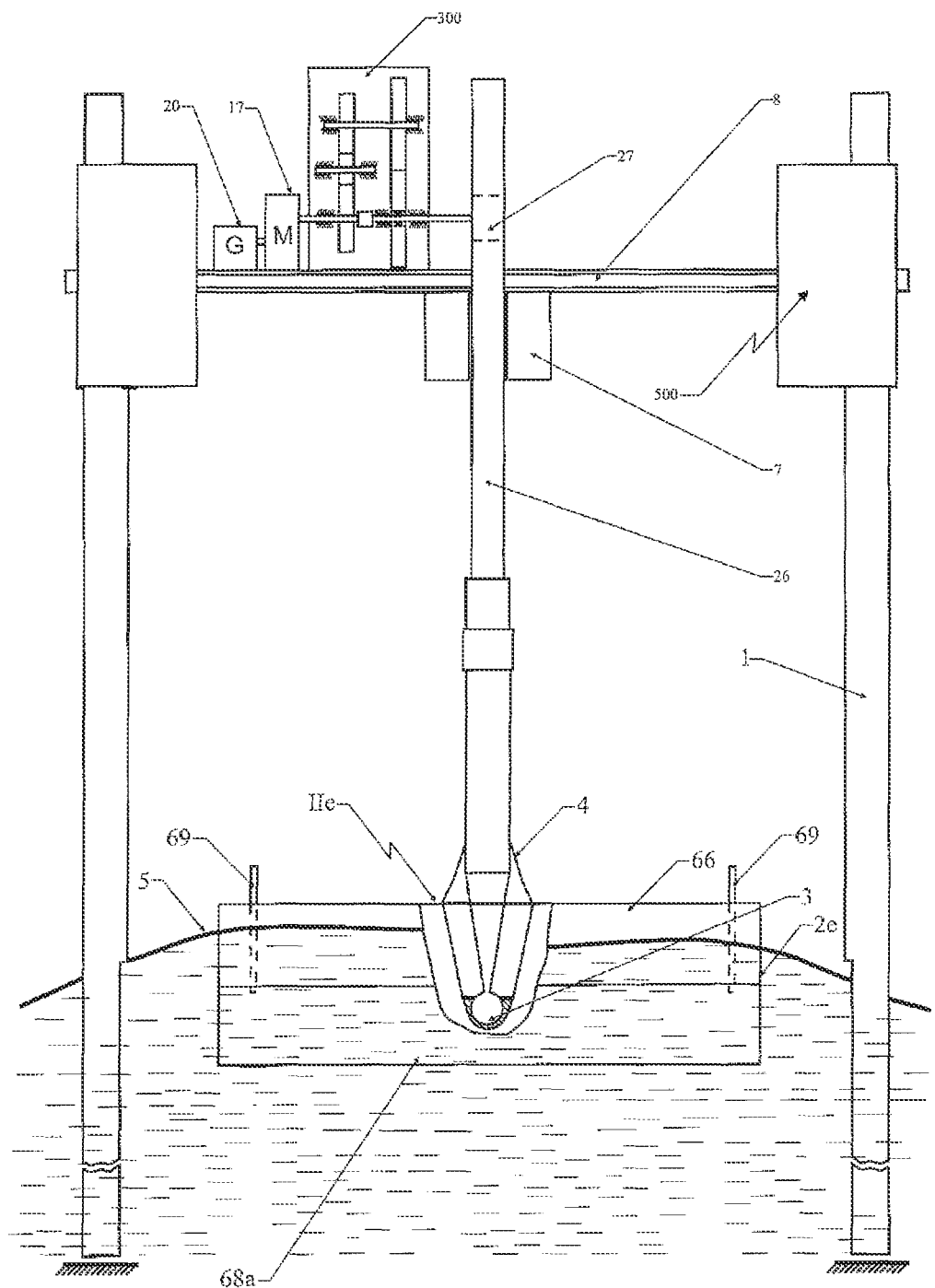
FIG. 13 shows the side view of another embodiment of energy generating system.

FIG. 13 shows floating working body IIe that uses an inflexible transmission shaft 26, guide 7 tractors and gear 27, connected to the mechanism 300. Output shaft of mechanism 300 is coupled to multiplier 17 and connected to the generator 20. In this embodiment working stroke is coupled realized through floating working body motion in the direction of the wave moving upwardly as well as in the opposite direction, and this is enabled by the implementation of the mechanism 300. By use of mechanism 300, both upward and downward movement of transmission shaft 26 causes rotation of generator 20 in one direction. Mechanism 300 with the multiplier 17 and generator 20 is inflexibly coupled to the beam 8, which is through the mechanism 500 connected to columns 1. Mechanism 500 is installed in the systems for converting aquatic wave energy into electrical energy in the areas where the difference in height between low and high tide is significant in order to reduce the length of inflexible transmission shaft 26, which reduced the size and weight of the shaft 26. Floating working body IIe is suitable for low and short waves.

Figure 14:
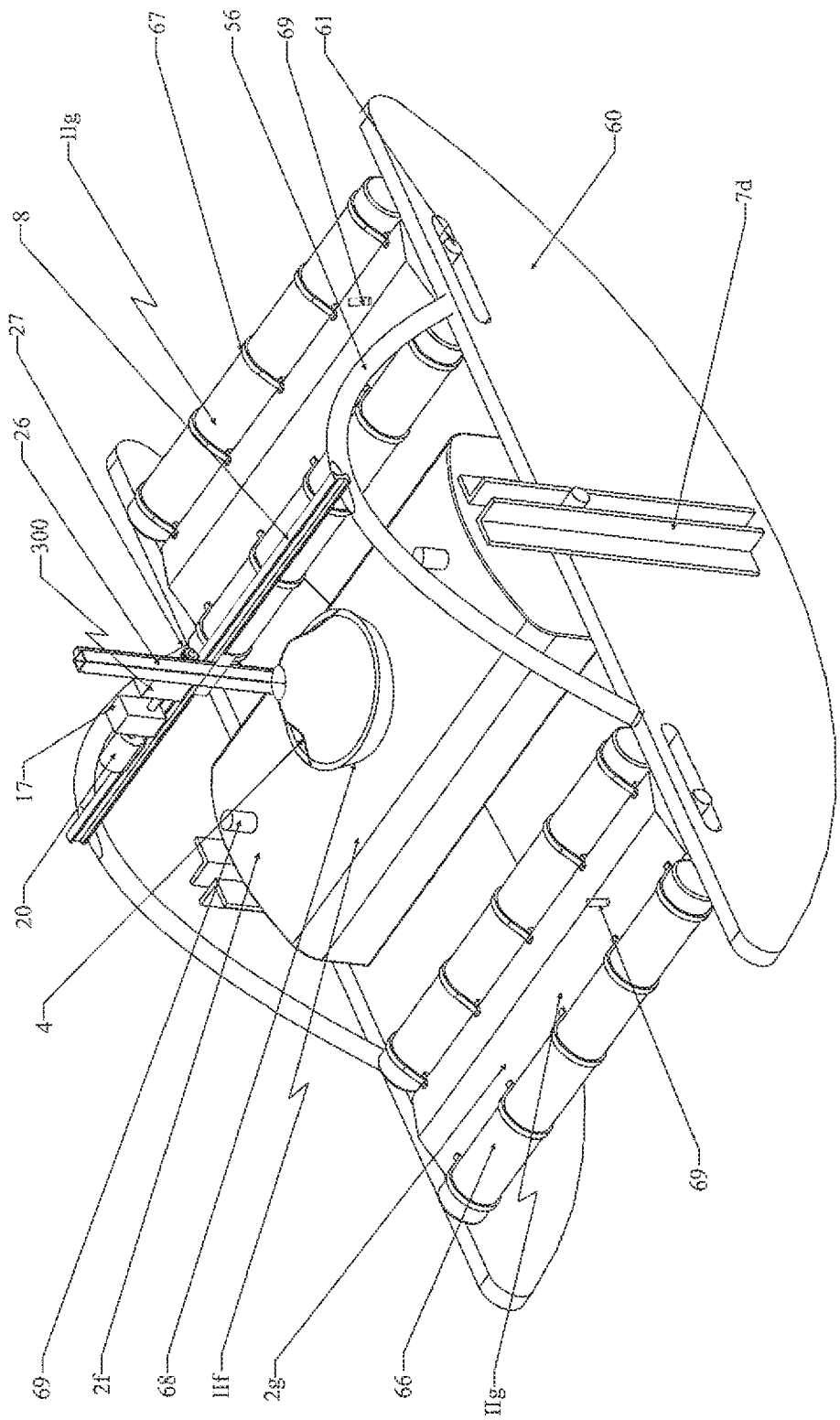
FIG. 14 shows another embodiment of the system for the production of electrical energy that is not secured to the sea (ocean) bed.

FIG. 14 shows an embodiment which is different from the embodiments mentioned so far because it is not secured to the sea (ocean) bed, but freely floats on the water surface and produces electricity at the expense of the relative differences in wave amplitudes. Floating body of FIG. 14 is a combination of the floating working body IIf and two floating bodies IIe. Floating body IIf is located in the central part and the inflexible transmission shaft 26 is coupled to the floating body IIf.

Floating bodies IIe are on both lateral sides of the floating working body IIf bodies. They are tightly, flexibly and rotationally coupled to floating body IIf, and this tight, flexible and rotational connection is obtained by lateral supports 60 with longitudinal guides 61. Supporting beam 8 in this embodiment is firmly connected to the arch supports 56 which are tightly connected to the lateral columns 60. Floating body IIf is, in its central part, flexibly and rotationally, over vertical guides 7d, coupled to lateral supports. The guides 7d enable vertical shifting of the floating body IIf.

This device uses a feature already mentioned. The dimensions of the floating body allow the device to take a position in which the longer side of the floating body is always parallel to the wave front. When the wave approaches the floating bodies IIg, they raise together with the wave while, at the same time, the central floating working body IIf, lowers with the wave, and as the result of this actions inflexible transmission shaft 26 begins to move, rotating the gear 27, mechanism 300 and the multiplier 17 to transmit torque to the generator 20. Depending on the frequency of waves, it is possible to adjust the distance between the floating working body IIf and floating bodies IIg.

FIGS. 15-15c show mechanism 300 for rotation direction alteration used to convert periodical variable operating motion ("up" and "down") of, the inflexible transmission shaft 26 at the input shaft 321, into one-way rotation of the output shaft 327. In other words, while input shaft rotates in a clockwise/counterclockwise direction in response to upward and downward movement of the transmission shaft 26, output shaft 327 only rotates in one direction.

The output shaft 327, in its basic embodiment, is co-axial with the input shaft 321. The input shaft 321 transmits its clockwise rotation, over clutch 322b, to the output shaft 327 of the mechanism 300. The characteristic of this embodiment is that both one-way clutches 322a and 322b are placed at the input shaft 321 and they operate as a pair. In this case, one-way clutch 322a is in idle motion and it does not transmit the clockwise turning moment.

In the case when the inflexible transmission shaft 26 moves towards water, i.e. when the input shaft 321 rotates in counter-clockwise direction, one-way clutch 322a transmits the turning moment to gear 323a, and over gear 323c and countershaft 325 and gear 323d, to idler gear 323e which converts the rotating direction together with the gear 323b. The gear 323b transmits the turning moment further to the output shaft 327 of the mechanism 300. Over bushing 326 the turning moment is transmitted further to the multiplier 17 and generator 20. While rotating in this direction the one-way clutch 322b does not transmit turning moment, but is idle.

Figure 16:
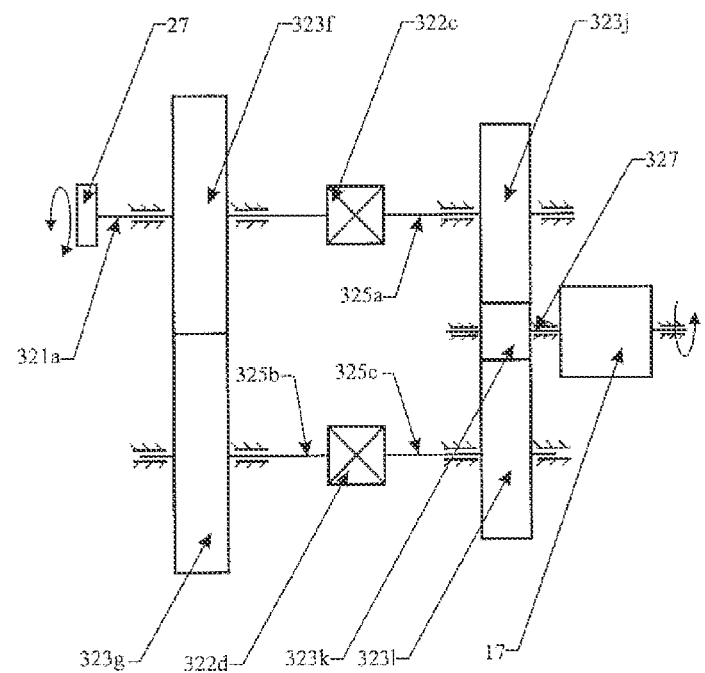
FIG. 16 is a schematic display of another variation of achieving constant rotational direction.

Another embodiment of the mechanism 300 is shown in FIG. 16. In this embodiment the input shaft 321a and the output shaft 327 are parallel, and one-way clutches 322c and 322d are at different shafts. Gear 27 is tightly coupled to one end of the input shaft 321a, and one-way clutch 322c is tightly coupled to the other end of the input shaft 321a. Gear 323f is coupled to gear 323g which is firmly attached to shaft 325b at one end, and one-way clutch 322d is firmly attached at the other end of shaft 325b. One end of the shaft 325a is firmly coupled to the housing of the one-way clutch 322c, and gear 323j is firmly attached to the other end of the shaft 325a. One end of the shaft 325c is tightly connected to the housing of the one-way clutch 322d, while gear 323 l is tightly connected to the other end of shaft 325c. Gears 323j and 323 l are joined together by means of an idler gear 323k which is tightly connected to the output shaft 327 of the mechanism 300.

Clockwise turning moment is transmitted to the input shaft 321a over gear 27, and when it rotates in the clockwise direction is transmitted by the one-way clutch 322c, and the turning moment is transmitted to gear 323j over shaft 325a, and further over gear 323k to output shaft 327. The clutch 322d is in this case is idle, and it does not transmit the turning moment. When it rotates in the counterclockwise direction force is transmitted by one-way clutch 322d, turning moment is transmitted from the input shaft 321a, over coupled gears 323f and 323g, to shaft 325b and clutch 322d. Clutch 322d transmits the turning moment to shaft 325c. Shaft 325c, over coupled gears 323 l and 323k, transmits the turning moment to the output shaft 327.

Figure 17:
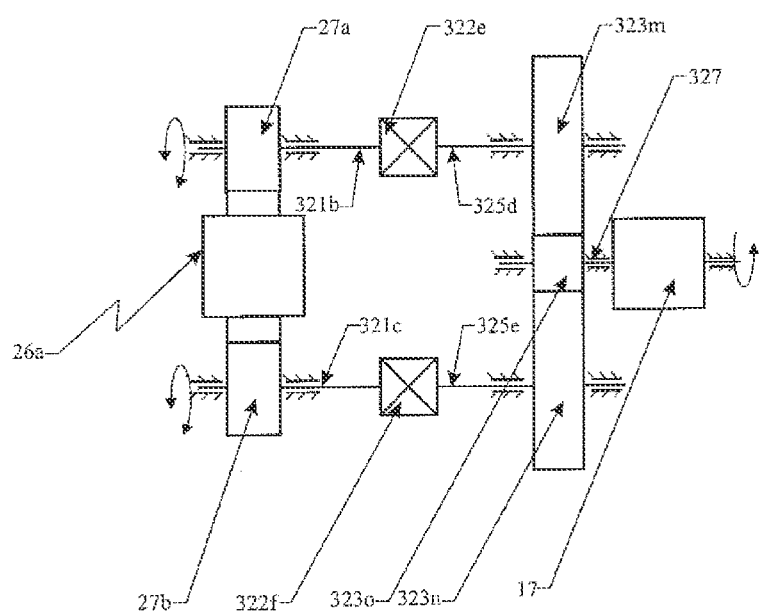
FIG. 17 is a schematic display of another way of achieving constant direction of rotation.

FIG. 17 shows version II of the mechanism 300 where an inflexible transmission shaft 26a with two parallel operating sides (in this version gear racks) is used as a drive to rotate gears 27a and 27b simultaneously. The mechanism has two parallel input shafts 321b and 321c. Gear 27a is firmly attached to one end of the shaft 321b, and one-way clutch 322e is attached to the other end. Gear 27b is firmly connected to one end of the shaft 321c, and one-way clutch 322f is attached to the other end. The one-way clutch housing 322e is tightly connected to one end of the shaft 325d, and gear 323m is coupled to the other end. The one-way clutch housing 322f is connected to one end of shaft 325e, and gear 323n is tightly connected to the other end. Gears 323m and 323n are coupled to the idler gear 323o which is attached to the output shaft 327.

Turning moment at the input shafts 321b and 321c is obtained by motion of the inflexible transmission shaft 26a, and over one-way clutch 322e it is transmitted to shaft 325d, and further, over gears 323m and 323n, to the output shaft 327. In this case, the one-way clutch 322f is in idle motion. When the turning moment is transmitted over one-way clutch 322f, from the input shaft 321c to shaft 325e, to gear 323n and over idler gear 323o to output shaft 327, one-way clutch 322e is in idle motion. In this embodiment, the number of gears in the mechanism is reduced, and as the result of this reduction, the initial moments of the mechanism 300 are decreased as well.

Figure 18:
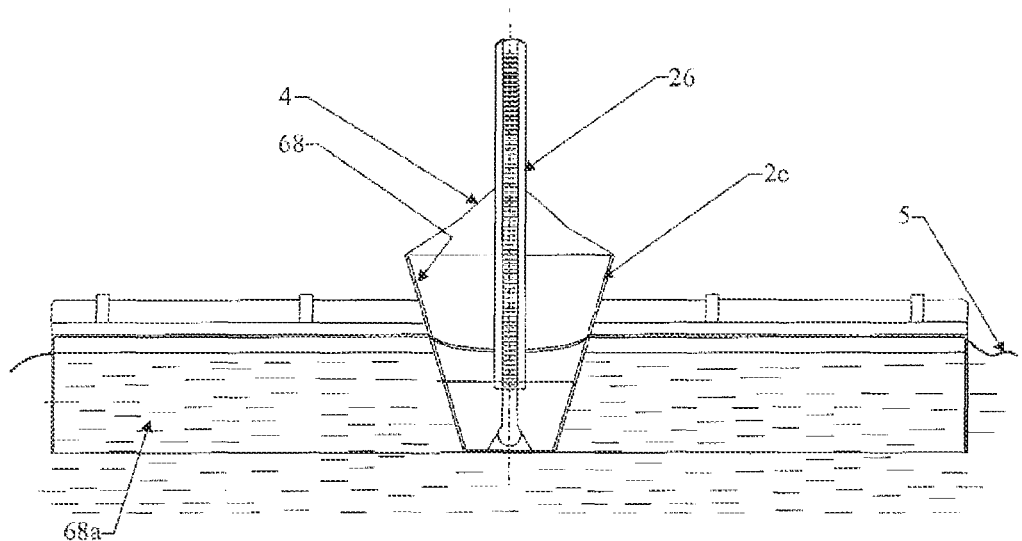
FIG. 18 is the sectional view of another embodiment of the floating body.
Figure 18A:
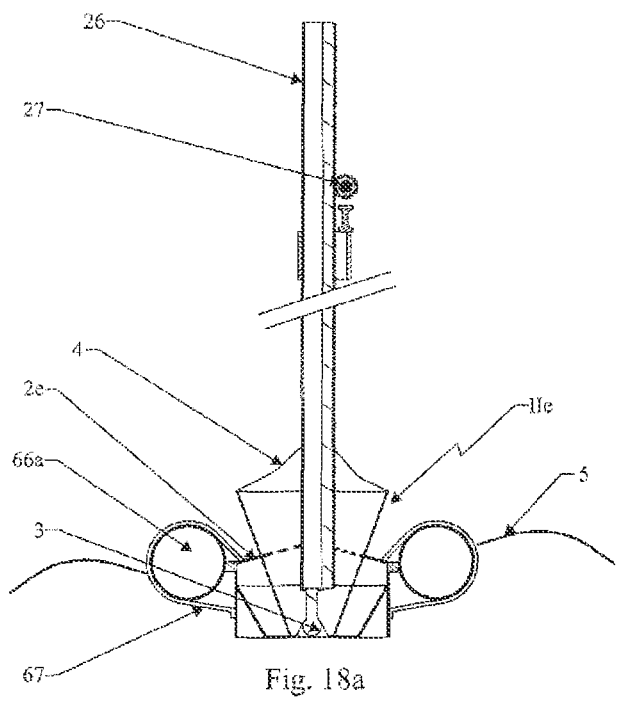
FIG. 18a shows the side view of the floating body of FIG. 18.

FIG. 18 and FIG. 18a show floating body IIe in the shape of a prism and is coupled to inflexible transmission shaft 26. Floating body IIe consists of a base 2e in the shape of a prism, with floats 66 tightly tied to its lateral sides. The floats 66 are tied by means of a profile 67 which allows floating body IIe to float. In the central upper part is a cylindrical part 68. Inflexible transmission shaft 26 with spherical joint 3 is connected to cylindrical part 68. Basically, the prismatic shape of the floating body IIe resulted from the feature that the longer side of the prism is always parallel to the wave front. That is, the longer side of the floating body is facing the waves heading toward the floating body. This feature is explained by the rule that the friction forces in the boundary layer, at body obstruction, are stronger at the longer side of the prism if it is positioned vertically to the wave front and those forces cause floating body to rotate. (Law of nature)

The base 2e has prismatic shape, similar to an open box which open side faces the water to ensure the creation of sub-pressure inside cavity 68a while floating body IIe floats. This sub-pressure is needed for achieving lower oscillation amplitude of the floating body IIe, and increases the mass of the floating body IIe, producing sufficiently strong downward force in the inflexible transmission shaft 26 during its motion downward towards the water surface. This arrangement essentially pulls floating body downwardly with the dissention of the waves. This is achieved by adding water volume captured inside the base 2e to the mass of the base 2e. This can be done only in the case when the top of the cavity 68a is in the still water (no waves) in the water surface level as shown in FIG. 18, thus achieving the effect of additional mass.

The central part 68 of the base 2e is cylindrical enabling the floating body IIe to rotate in respect to inflexible transmission shaft 26 that is attached to the base 2e over a spherical joint 3.

Flexible cover 4 is placed on the central part 68 of the base. The cover does not obstruct rotation and prevents water from entering the central part 68. Floating body IIe is designed for higher and longer waves 5.

FIG. 19, FIG. 19a, and FIG. 19b show floating body IIf with the base in the shape of a prism. Irreversible valves 69 are built in the upper side of the floating body IIf. In the central upper side of the body is a cavity 68. Inflexible transmission shaft 26 with spherical joint 3 is connected to the cylindrical part 68. Bottom side of the floating body IIf has a cavity 68a along the entire length of the floating body IIf. The cavity 68a goes to the shorter, lateral sides that are closed along the entire height of the floating body IIf. Chambers 68b inside the floating body IIf provide navigability and buoyancy of the floating body IIf.

One-way valves 69 release air captured below the floating body into atmosphere, and water fills that space and thus, increases the mass of the floating body IIf. The wave energy captured inside the cavity 68a move upwards vertically, increase the stability of the floating body IIf, and together with enlarged mass of the floating body, increase turning moment at the generator 20 shaft. Floating body IIf is designed for higher and longer waves 5.

Figure 20:
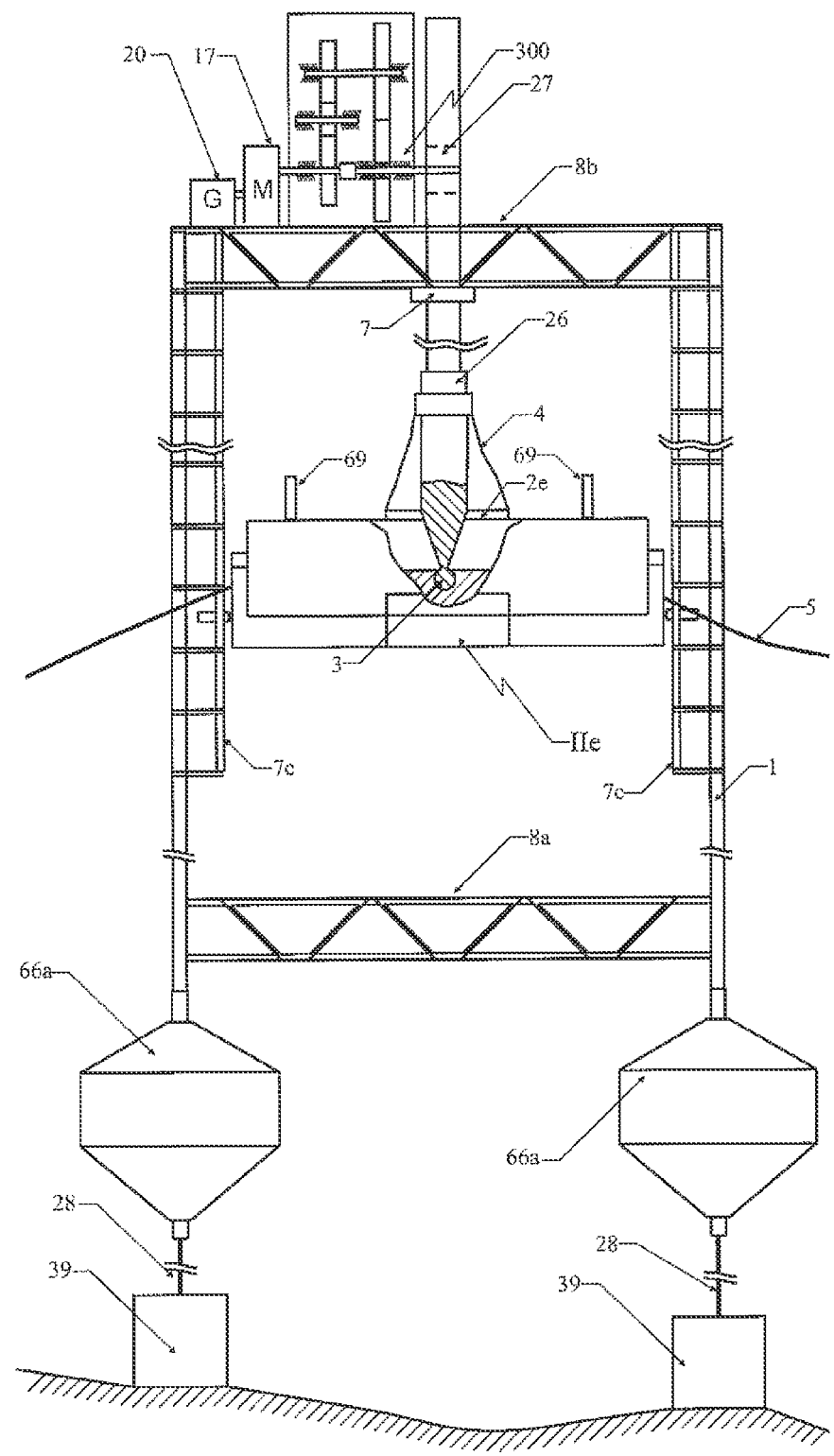
FIG. 20 shows another embodiment of the system for converting aquatic wave movement into electrical energy.

FIG. 20 shows another embodiment of the system which consists of floating working body IIe coupled to the inflexible transmission shaft 26 by the spherical joint 3. The inflexible transmission shaft 26 is connected to the mechanism 300 over guide 7 and gear 27. Output shaft of the mechanism 300 is connected to the generator 20 through the multiplier 17. Transmission shaft 26 includes teeth that engage gear 27.

Proper motion of the floating working body IIe is provided by guides 7c that are inflexibly attached to the columns 1. Columns 1 are mutually joined by a lattice girder 8a near the end of column 1 which is submerged in water and lattice girder 8b on the second end of the columns 1 which are out of water. Floats 66a, which provide buoyancy of the system, are installed at the very end of columns 1. The floats 66a are at one end tied to the column 1, and at the second end of floats 66a is the flexible binding element 28 (a rope, a chain, a cable, etc.) which has weights 39 positioned on the sea (ocean) bottom. Floats 66a should be placed in the zone where is no transversal movement of water particles (i.e. in the zone of still water). Mechanism 300 with the multiplier 17 and generator 20 is inflexibly connected to the lattice girder 8b, which is inflexibly coupled to the columns 1.

In this embodiment the working stroke is realized through the motion of the floating working body IIe in the direction of the waves moving upwardly as well as in the opposite direction, and this is enabled by the implementation of the mechanism 300. When a wave 5 approaches, floating working body IIe over the inflexible transmission shaft 26 starts the gear 27, which transmits rotary movement to the generator 20 that produces electricity, through the mechanism 300 and the multiplier 17. For one floating body, one supporting column 1 can be used, which would pass through the body axis, the gear rack 26 would be located in column 1 and the connection between the gear rack 26 and the floating working body IIe would be achieved by a spherical joints so that the sphere was in contact with the floating working body IIe, and over two or more axles attached to the gear rack 26. Floating working body IIe is suitable for low and short waves 5.

FIG. 20a is an isometric view of one cell for electrical energy generation. Complete construction of the device consists of at least two mechanisms, shown in FIG. 20, which are connected by lattice girder 8c, one of the ways to connect is shown in FIG. 20a. Alternately placing the generator 20 and the accompanying mechanisms (multiplier 17 and mechanism 300) provides a stable vertical position of the structure. In the case of even number of mechanisms, shown in FIG. 20, it is necessary that the generator 20 and the accompanying mechanisms (multiplier 17 and mechanism 300) are of the same mass, while in the case of odd number of mechanisms, shown in FIG. 20, the mass at both ends of the structure must be matched to avoid turning the structure on one side.

Figure 20B:
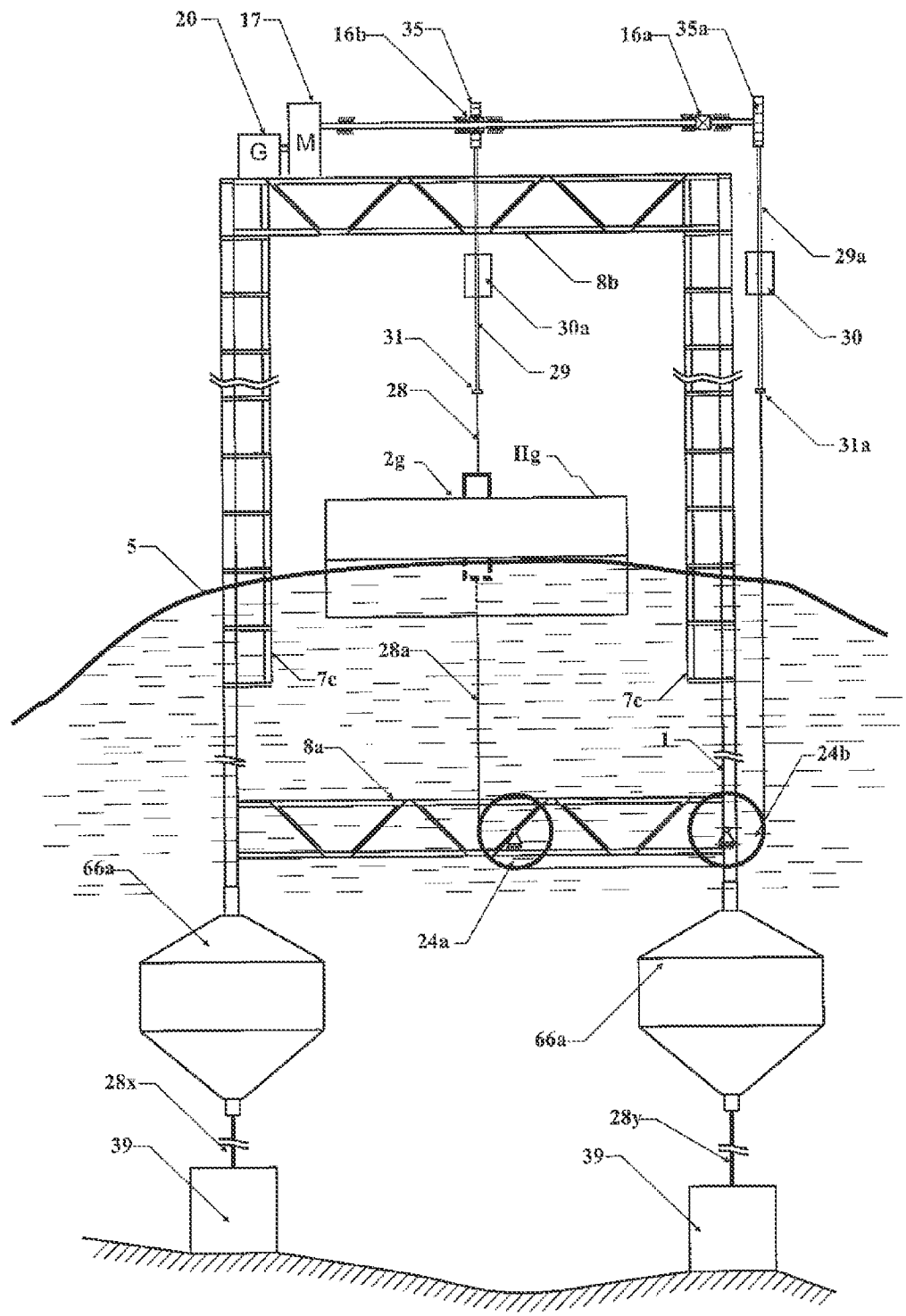
FIG. 20b shows another embodiment of the system for converting aquatic wave movement into electrical energy using flexible transmission shafts.

FIG. 20b is another embodiment, similar to FIG. 20 with the exception that flexible cables 28 and 28a are coupled to float IIg. Cable 28a passes over pulleys 24a, 24b and up to pulley 35a. Cable 28 is coupled to the top of float IIg and is coupled to pulley 35. Pulleys 35, 35a are used in conjunction with one way gearboxes 16a, 16b so that one way rotational direction is transmitted to multiplier 17 and to generator 20 to generate electrical power.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There is a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A system for producing electric power by converting wave motion of a body of water to electrical energy comprising:
   a first support structure having at least two first laterally spaced supports and a second support structure opposing and spaced from the first support structure, the second support structure having at least two second laterally spaced supports;
   a floating body positioned between and supported by the first and second support structures, the floating body having four sides wherein the first side is longer than the second side and the third side is longer than the fourth side, the floating body being positioned between the first and second support structures along the first and third sides of the floating body such that the first lateral support extends along the first side of the floating body and the second lateral support extends along the third side of the floating body, the floating body configured to float on the body of water between first and second laterally spaced supports;
   first and second pulleys located on each support structure wherein the first pulley is vertically spaced from the second pulley;
   a plurality of flexible transmission members coupled to the floating body at a first end and to one of the pulleys at a second end, the flexible transmission members being configured to allow vertical movement of the floating body in response to the wave motion on the body of water; and
   one or more generators adapted to be coupled to at least one of the transmission members so that movement of the transmission member causes the generator to generate electrical energy.

2. The system of claim 1, wherein in the floating body include outwardly extending brackets.

3. The system of claim 2, wherein the brackets extend outwardly from the first side of the floating body.

4. The system of claim 1, wherein the floating body is suspended between and does not contact the support structures.

5. The system of claim 2, wherein the floating body has a top surface and some of the brackets extend above the top surface and some of the brackets extend below the top surface.

6. The system of claim 1, wherein the system includes a first generator connected to the first support structure and a second generator connected to the second support structure.

7. The system of claim 1, wherein one of the first and second pulleys is coupled to one of the generators.

8. The system of claim 7, wherein vertical movement of the floating body causes transmission members to rotate first and second pulleys to cause rotation of a shaft of the generator to generate electrical energy.

9. The system of claim 8 wherein the system includes counterweights that assist in maintaining tension on the flexible transmission members.

10. The system of claim 1, wherein the length to width ratio of the floating body is at least 3 to 1.

11. The system of claim 1, wherein the length to width ratio of the floating body is at least 4 to 1.

12. The system of claim 1, wherein the length to width ratio is from about 3 to 1 to about 10 to 1.

13. A system for producing electric power by converting wave motion of a body of water to electrical energy comprising:
    a first support structure having at least two first laterally spaced supports and a second support structure opposing and spaced from the first support structure, the second support structure having at least two second laterally spaced supports;
    an elongated floating body positioned between and supported by the first and second support structures, the floating body having four sides wherein the first side is longer than the second side and the third side is longer than the fourth side, the floating body being positioned between the first and second support structures along the first and third sides of the floating body such that the first lateral support extends along the first side of the floating body and the second lateral support extends along the third side of the floating body, the floating body configured to float on the body of water between the first and second laterally spaced supports;
    a plurality of transmission members in the form of gear racks that are coupled to the floating body, the transmission members being configured to allow vertical movement of the floating body in response to the wave motion on the body of water and adapted to engage gears rotatably secured to the support structures; and
    a generator adapted to be coupled to at least one of the transmission members so that movement of the transmission member causes the generator to generate electrical energy.

14. The system of claim 13, wherein one of the gears are coupled to one of the generators.

15. The system of claim 14, wherein vertical movement of the floating body causes the transmission members to rotate one of the gears to cause rotation of a shaft of the generator to generate electrical energy.

16. The system of claim 13, wherein the length to width ratio of the floating body is at least 3 to 1.

* * * * *